(12) United States Patent
Kim et al.

(10) Patent No.: US 11,086,335 B2
(45) Date of Patent: Aug. 10, 2021

(54) DRIVING ASSISTANCE SYSTEM AND VEHICLE COMPRISING THE SAME

(71) Applicant: LG Electronics Inc., Seoul (KR)

(72) Inventors: Daebum Kim, Seoul (KR); Jongin Son, Seoul (KR); Kihoon Han, Seoul (KR)

(73) Assignee: LG Electronics Inc., Seoul (KR)

(*) Notice: Subject to any disclaimer, the term of this patent is extended or adjusted under 35 U.S.C. 154(b) by 549 days.

(21) Appl. No.: 15/855,292

(22) Filed: Dec. 27, 2017

(65) Prior Publication Data
US 2019/0056749 A1 Feb. 21, 2019

(30) Foreign Application Priority Data
Aug. 16, 2017 (KR) .................. 10-2017-0103749

(51) Int. Cl.
*G05D 1/02* (2020.01)
*B60R 1/12* (2006.01)
(Continued)

(52) U.S. Cl.
CPC ............ *G05D 1/0251* (2013.01); *B60J 5/047* (2013.01); *B60R 1/00* (2013.01); *B60R 1/062* (2013.01);
(Continued)

(58) Field of Classification Search
CPC ............... G05D 1/0251; G05D 1/0214; H04N 5/23299; H04N 13/211; H04N 5/23296; G06F 3/00; B60J 5/047; G06K 9/00805; B60R 1/062; B60R 1/12; B60R 2300/802; B60R 2300/101; B60R 2300/605; B60R 2001/1253; B60R 2300/806; B60R 1/06; B60R 1/00; B60W 40/105; B60W 40/02; B60W 30/095; B60W 30/00; B60W 50/14;
(Continued)

(56) References Cited

U.S. PATENT DOCUMENTS

| | | | | |
|---|---|---|---|---|
| 4,641,136 A | * | 2/1987 | Kowalczyk | ............ B60Q 9/008 340/904 |
| 2008/0009990 A1 | * | 1/2008 | Katoh | ................ B62D 15/0285 701/36 |

(Continued)

FOREIGN PATENT DOCUMENTS

| JP | 2009114783 A | 5/2009 |
|---|---|---|
| JP | 2014504228 A | 2/2014 |

(Continued)

*Primary Examiner* — Adam R Mott
(74) *Attorney, Agent, or Firm* — Fish & Richardson P.C.

(57) ABSTRACT

A driving assistance system includes a camera and at least one processor. The camera is disposed on a mounting apparatus that is rotatably coupled to a vehicle and that rotates about a rotation axis that is spaced apart from the camera. The camera is configured to rotate together with the mounting apparatus from a first point to a second point, and to capture an external image of the vehicle at the first point and the second point. The processor is configured to control the camera to capture a first image at the first point and a second image at the second point, detect an object around the vehicle based on the first image and the second image, and determine a distance between the object and the vehicle based on the first image and the second image.

20 Claims, 30 Drawing Sheets

(51) Int. Cl.
*B60R 1/062* (2006.01)
*G06K 9/00* (2006.01)
*H04N 5/232* (2006.01)
*B60J 5/04* (2006.01)
*H04N 13/211* (2018.01)
*G06F 3/00* (2006.01)
*B60W 30/00* (2006.01)
*B60R 1/00* (2006.01)

(52) U.S. Cl.
CPC ............... *B60R 1/12* (2013.01); *B60W 30/00* (2013.01); *G05D 1/0214* (2013.01); *G06F 3/00* (2013.01); *G06K 9/00805* (2013.01); *H04N 5/23296* (2013.01); *H04N 5/23299* (2018.08); *H04N 13/211* (2018.05); *B60R 2001/1253* (2013.01); *B60R 2300/101* (2013.01); *B60R 2300/605* (2013.01); *B60R 2300/802* (2013.01); *B60R 2300/806* (2013.01)

(58) Field of Classification Search
CPC ........ B60W 2420/42; B60W 2050/146; B60K 35/00; B60K 28/12; G01C 11/06
See application file for complete search history.

(56) References Cited

U.S. PATENT DOCUMENTS

| | | | |
|---|---|---|---|
| 2015/0203038 A1* | 7/2015 | Haeussler | B60R 1/062 701/49 |
| 2017/0116758 A1* | 4/2017 | Grewe | B60R 11/04 |
| 2017/0185763 A1* | 6/2017 | Jeromin | G06F 21/32 |
| 2018/0118100 A1* | 5/2018 | Kjaer-Lohse | B62D 15/027 |
| 2019/0377343 A1* | 12/2019 | Chan | G06K 9/00812 |
| 2020/0090437 A1* | 3/2020 | Ichinose | G06F 3/04817 |

FOREIGN PATENT DOCUMENTS

| | | |
|---|---|---|
| KR | 2012058208 A | 6/2012 |
| KR | 2017042142 A | 4/2017 |
| KR | 102017072665 | 6/2017 |

* cited by examiner

FIG. 1
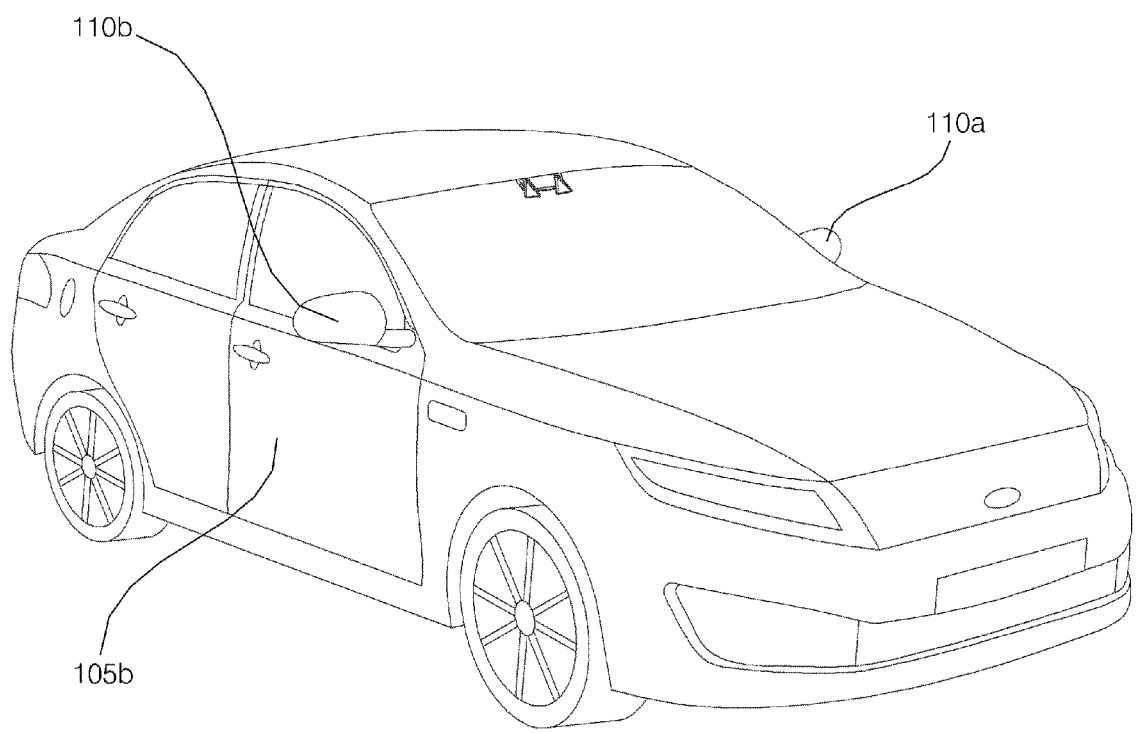
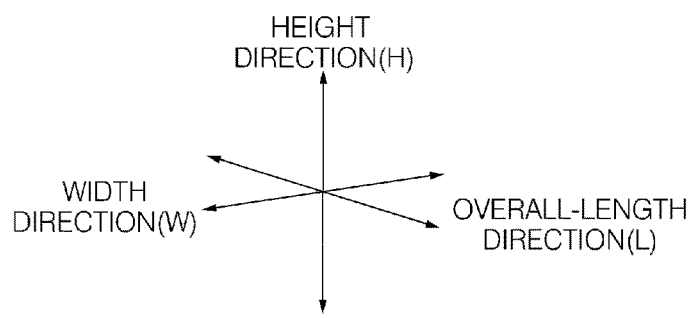

Folding

Unfolding decelerating accelerating

DRIVING ASSISTANCE SYSTEM AND VEHICLE COMPRISING THE SAME

CROSS-REFERENCE TO RELATED APPLICATION

This application claims the priority benefit of Korean Patent Application No. 10-2017-0103749, filed on Aug. 16, 2017, in the Korean Intellectual Property Office, the disclosure of which is incorporated herein by reference.

FIELD

The present disclosure relates to a driving assistance system for assisting operation of a vehicle.

BACKGROUND

A vehicle is an apparatus which a user can ride and/or drive in a desired direction. An example of the vehicle may be a car.

For convenience of the user who uses the vehicle, the vehicle may be provided with, for example, various sensors and electronic apparatuses. For example, for the convenience of the user, research on advanced driver assistance system (ADAS) has been actively conducted. Recently, development of an autonomous vehicle has been actively conducted.

In order to detect a distance to an object or the like using a camera, disparity information may be used in a stereo image acquired from a stereo camera.

In some cases, a plurality of images may need to be captured while moving a vehicle to detect a distance to an object or the like when the vehicle is equipped with only a monocular camera.

According to the present disclosure, a distance to an object or the like around a vehicle may be detected by using a monocular camera even when the vehicle is stopped.

SUMMARY

The present disclosure may provide a driving assistance system that determines a distance between a vehicle and an object using a monocular camera when a vehicle is stopped.

The present disclosure may further provide a method of generating a route for a vehicle to depart from a parked state based on measured object information.

The present disclosure may further provide a method of securing the safety of a user by controlling a door of a vehicle based on object information.

The present disclosure may further provide a display method for transmitting a captured image and/or information generated based on the captured image to a user.

According to one aspect of the subject matter described in this application, a driving assistance system for a vehicle includes a camera disposed on a mounting apparatus in which the mounting apparatus has an end that is rotatably coupled to the vehicle and that is configured to rotate about a rotation axis that is spaced apart from the camera. The camera is configured to rotate together with the mounting apparatus from a first point to a second point, where the camera is configured to capture an external image of the vehicle at the first point and at the second point. The driving assistance system further includes at least one processor configured to (i) control the camera to capture a first image at the first point and a second image at the second point, the first image and the second image including an overlapping area, (ii) detect an object around the vehicle based on an image processing of the first image and the second image, and (iii) determine a distance between the object and the vehicle based on the first image and the second image.

Implementations according to this aspect may include one or more of the following features. For example, the rotation axis may form an angle less than 90 degrees with respect to a direction perpendicular to a ground. In some examples, the camera may be disposed on a side mirror of the vehicle that is configured to rotate about the rotation axis, and the camera may be further configured to capture the external image of the vehicle during a rotation of the side mirror. In some examples, the camera may be disposed on a front door of the vehicle and further configured to capture the external image of the vehicle during a rotation of the front door.

In some implementations, the at least one processor may be further configured to generate a route for the vehicle to depart from a parked state based on location information of the object around the vehicle. The at least one processor may be further configured to: determine whether the object is located in a space through which the vehicle passes based on the vehicle traveling in a straight line; and generate the route for the vehicle to depart from the parked state that allows the vehicle to avoid the object based on a determination that the object is located in the space through which the vehicle passes based on the vehicle traveling in the straight line.

In some examples, the at least one processor is further configured to: determine whether the object is located in a space through which the vehicle passes based on the vehicle traveling in a forward direction; and generate the route for the vehicle to depart from the parked state that allows the vehicle to move in a backward direction opposite to the forward direction based on a determination that the object is located in the space through which the vehicle passes based on the vehicle traveling in the forward direction.

In some implementations, the driving assistance system may further include an interface configured to communicate with the at least one processor. In this case, the at least one processor may be further configured to identify a mode for the vehicle to depart from the parked state based on a selection of one of a plurality of maneuvers for the vehicle to depart from the parked state and a selection of one of a plurality of directions for the vehicle to depart from the parked state. The plurality of maneuvers for the vehicle to depart from the parked state may include a right-angle maneuver and a parallel maneuver, and the plurality of directions for the vehicle to depart from the parked state may include a left front direction, a left rear direction, a right front direction, and a right rear direction of the vehicle. The at least one processor may be further configured to generate the route for the vehicle to depart from the parked state based on the mode, and control the interface to provide a signal to a vehicle driving device to thereby control the vehicle to travel along the route for the vehicle to depart from the parked state.

In some examples, the camera may be disposed on a side mirror of the vehicle and further configured to capture the external image of the vehicle, and the at least one processor may be further configured to, based on the object being located in the route for the vehicle to depart from the parked state, control the interface to provide a signal to a mirror driving unit to cause the mirror driving unit to fold the side mirror based on the vehicle approaching the object, or to unfold the side mirror based on the vehicle moving away from the object.

In some examples, the at least one processor may be further configured to, based on the object being located in the route for the vehicle to depart from the parked state, control the interface to provide a signal to a power train driving unit to cause the power train driving unit to decelerate the vehicle based on the vehicle approaching the object, or to accelerate the vehicle based on the vehicle moving away from the object.

In some examples, the at least one processor may be further configured to generate the route from a first location at which the vehicle is parked to a second location at which a driver side door of the vehicle is able to be opened to a preset amount of opening, and control the interface to provide a signal to a door driving unit to cause the door driving unit to open the driver side door based on an arrival of the vehicle at the second location.

In some implementations, the at least one processor may be further configured to identify an amount of opening of a door of the vehicle based on location information of the object, and control the interface to provide a signal to a door driving unit to cause the door driving unit to open the door of the vehicle to the identified amount of opening. In some examples, the at least one processor may be further configured to identify the amount of opening of the door of the vehicle based on distance information between the door of the vehicle and the object.

In some examples, the at least one processor is further configured to determine a distance between the vehicle and the object that approaches the vehicle based on the location information of the object, and control the interface to provide a signal to the door driving unit to cause the door driving unit to close the door based on a determination that the object approaches the vehicle within a distance from the door.

In some implementations, the driving assistance system may further include a display, and the at least one processor may be further configured to control the display to display an image captured by the camera. In some examples, the at least one processor may be further configured to control the display to display, based on a measurement of a distance between the object and the vehicle, a first area where the distance has been measured such that the first area appears differently in the image from a second area where the distance has not been measured.

In some examples, the at least one processor may be further configured to control the display to display images captured by the camera in which the images have directionality corresponding to a direction of rotation of the mounting apparatus. In some examples, the at least one processor may be further configured to control the display to superimpose, on to the image, information regarding motion of the object. The at least one processor may be further configured to control the display to display the image and at least a portion of information generated by an image processing of the image captured by camera.

According to another aspect, a vehicle includes a plurality of wheels, a power source configured to drive a rotation of at least one of the plurality of wheels, and a driving assistance system. The driving assistance system for a vehicle includes a camera disposed on a mounting apparatus in which the mounting apparatus has an end that is rotatably coupled to the vehicle and that is configured to rotate about a rotation axis that is spaced apart from the camera. The camera is configured to rotate together with the mounting apparatus from a first point to a second point, where the camera is configured to capture an external image of the vehicle at the first point and at the second point. The driving assistance system further includes at least one processor configured to (i) control the camera to capture a first image at the first point and a second image at the second point, the first image and the second image including an overlapping area, (ii) detect an object around the vehicle based on an image processing of the first image and the second image, and (iii) determine a distance between the object and the vehicle based on the first image and the second image.

The present disclosure may provide a solution to the above-mentioned problems as well as other problems not mentioned, and can be clearly understood by those skilled in the art from the following description.

The implementations of the present disclosure may have one or more of the following effects.

First, since a distance between a vehicle and surrounding objects can be measured using a monocular camera in a state where the vehicle is stopped, it may be possible to provide a low-cost, high-efficiency driving assistance system.

Second, a vehicle route can be efficiently generated based on measured object information, thereby improving user convenience.

Third, an amount of door opening of a vehicle can be set based on object information, and a door can be controlled to be opened by the amount of door opening, thereby ensuring safety of a user.

Fourthly, as a distance between an object and a vehicle is measured, an area where the distance is measured can be displayed differently from an area where the distance is not measured, thereby delivering a captured image and/or information generated based on the captured image to a user.

The effects of the present disclosure are not limited to the effects mentioned above, and other effects not mentioned can be clearly understood by those skilled in the art from the description of the claims.

BRIEF DESCRIPTION OF THE DRAWINGS

FIG. 1 is a diagram illustrating an example external appearance of an example vehicle.

DETAILED DESCRIPTION

Description will now be given in detail according to exemplary implementations disclosed herein, with reference to the accompanying drawings.

A vehicle described in this specification may include a car, a motorcycle, and other type of vehicles. Hereinafter, a description will be given based on a car.

A vehicle as described in this specification may include an internal combustion engine vehicle having an engine as a power source, a hybrid vehicle having an engine and an electric motor as a power source, an electric vehicle having an electric motor as a power source, and the like.

In the following description, the left side of the vehicle refers to the left side in the traveling direction of the vehicle, and the right side of the vehicle refers to the right side in the traveling direction of the vehicle.

FIG. 1 is a diagram illustrating an example external appearance of an example vehicle.

Figure 2:
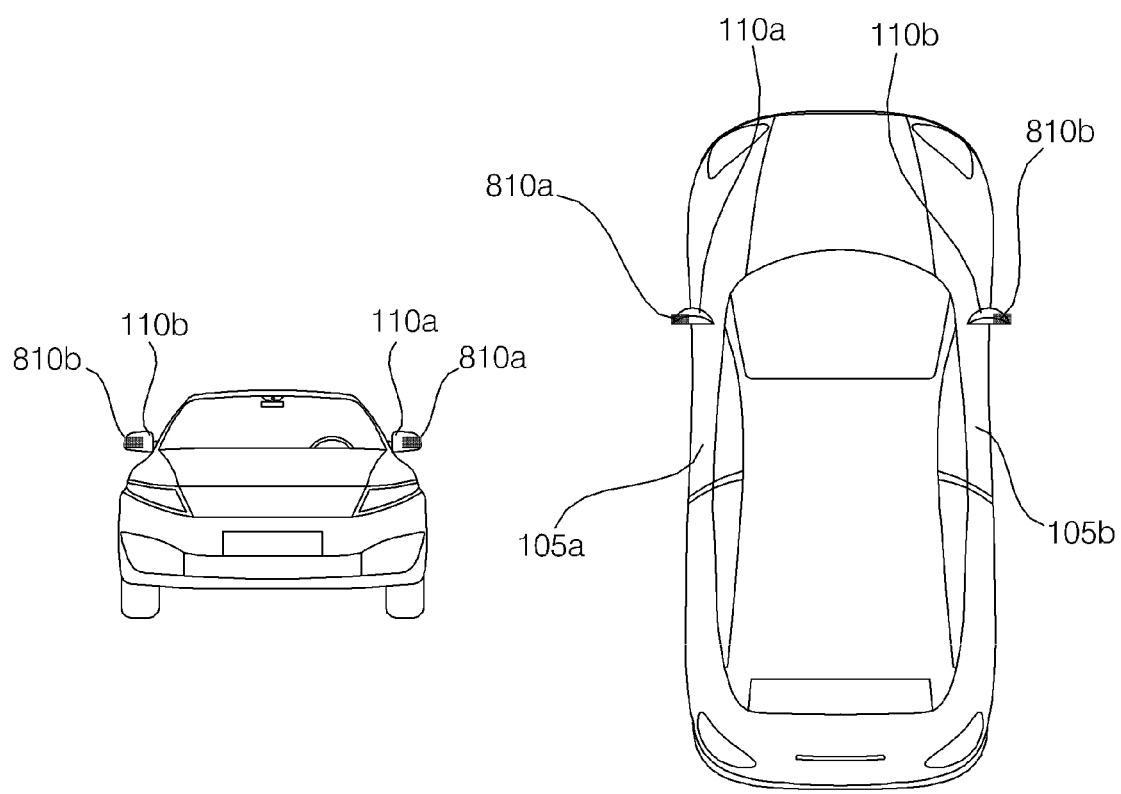
FIG. 2 is a diagram of an example vehicle viewed from various angles.

FIG. 2 is a diagram of an example vehicle viewed from various angles.

Figure 3:
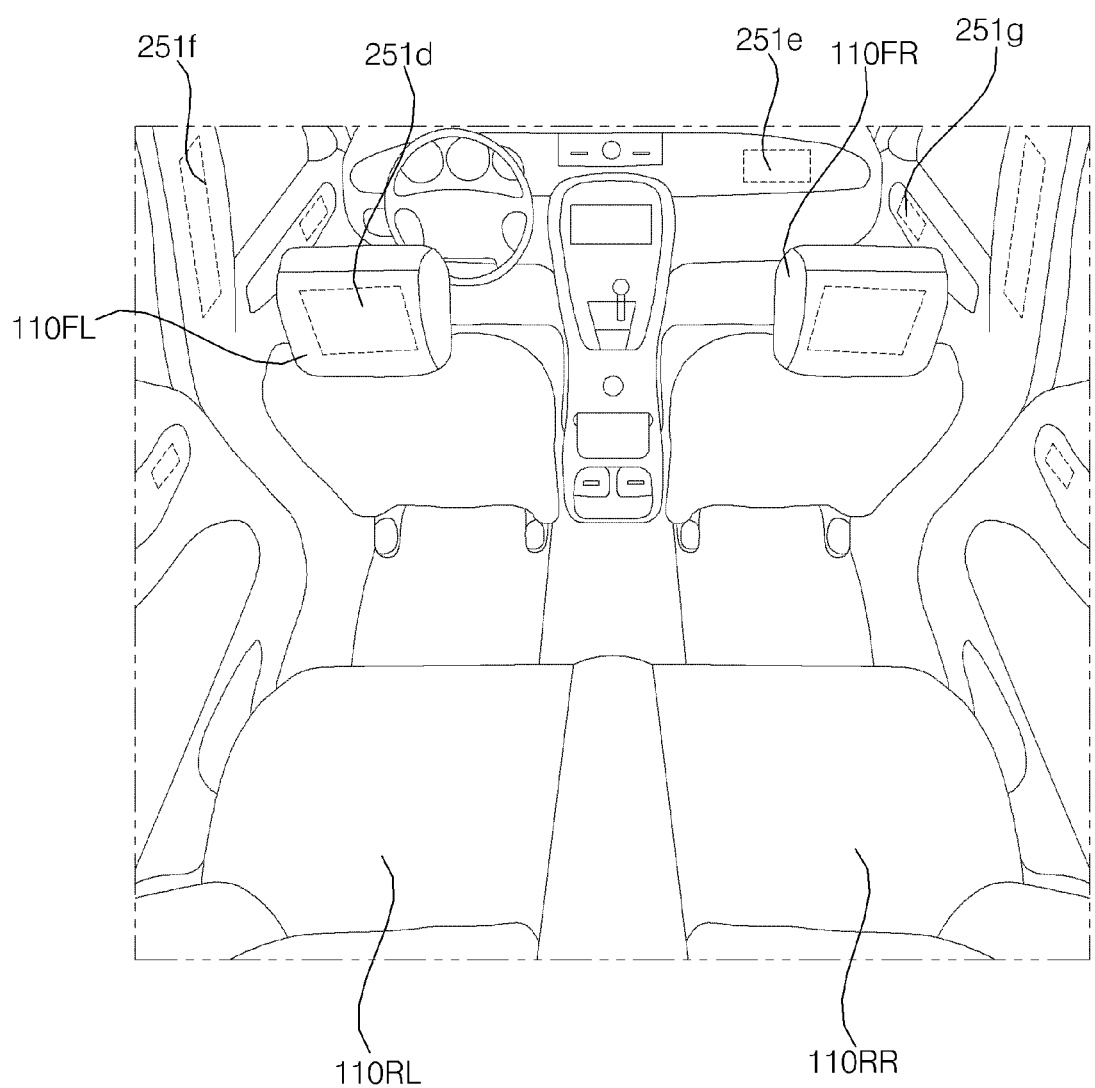
FIG. 3 and FIG. 4 are diagrams illustrating example interiors of an example vehicle.
Figure 4:
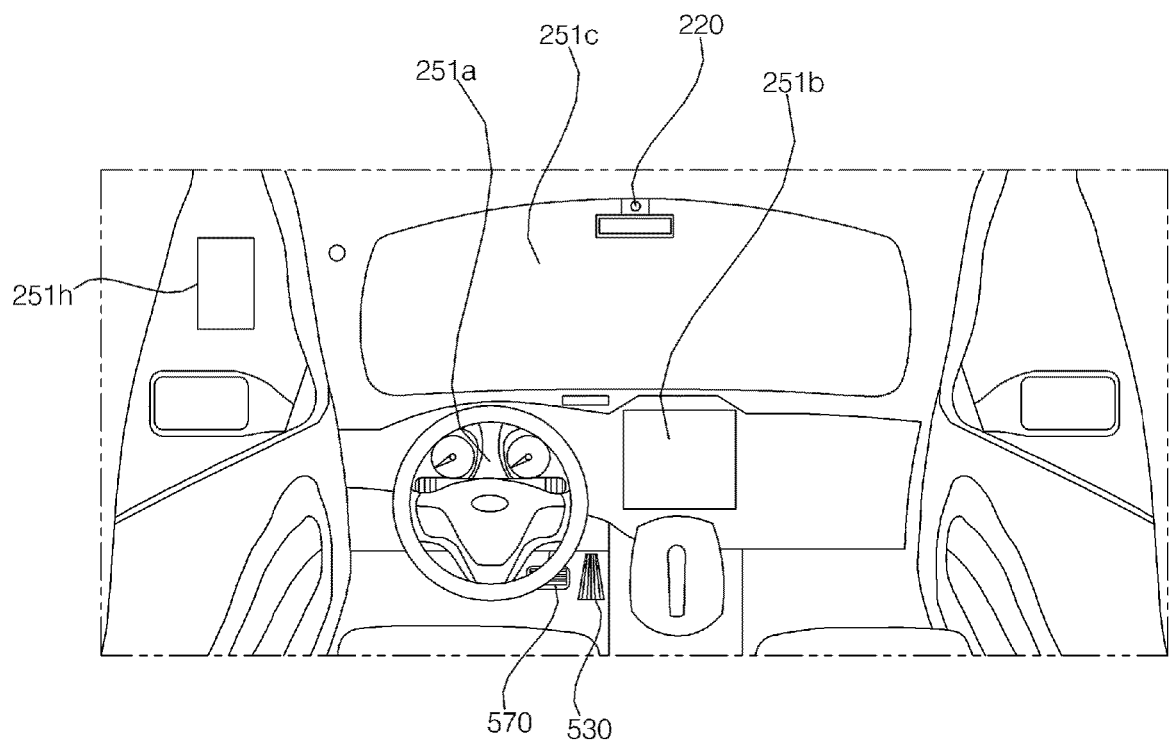

FIG. 3 and FIG. 4 are diagrams illustrating an example interior of a vehicle.

Figure 5:
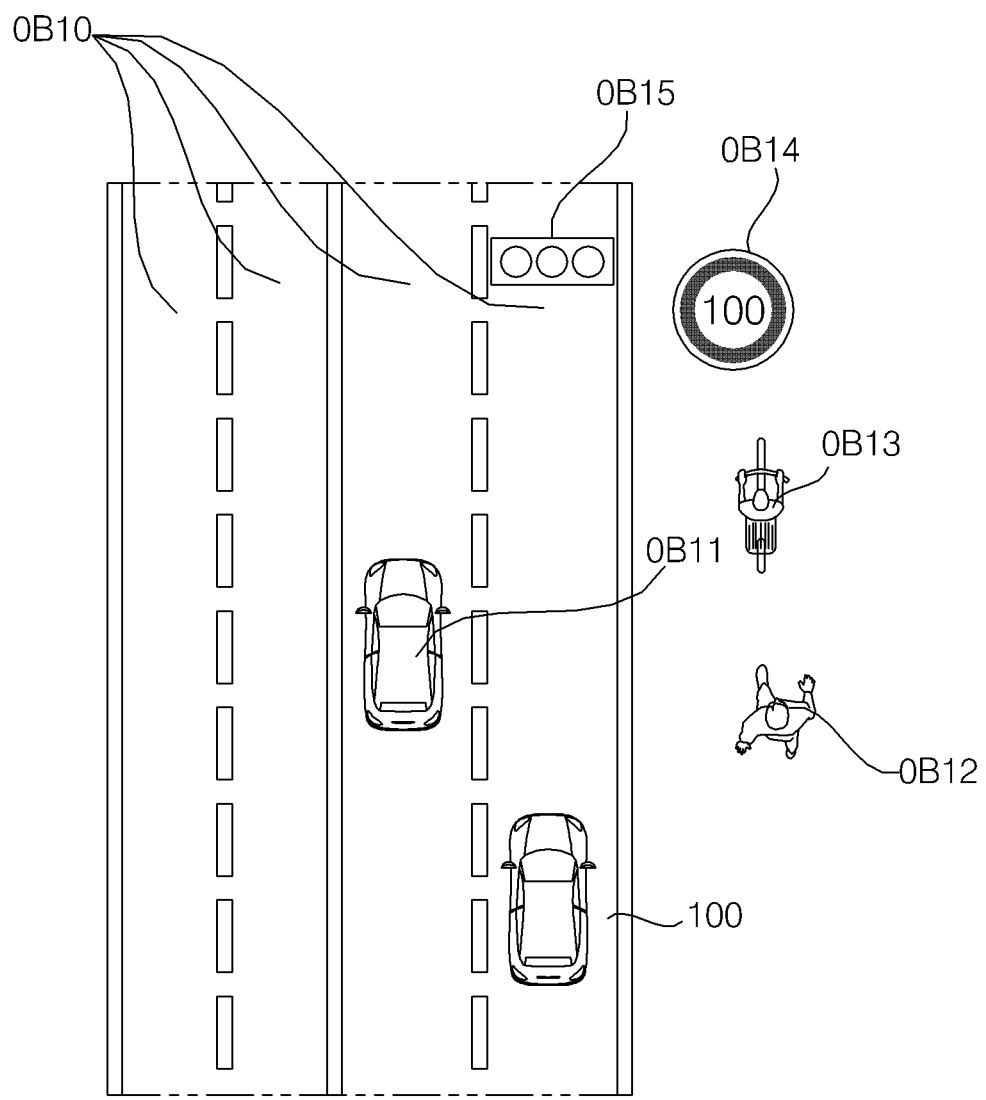
FIG. 5 and FIG. 6 are diagrams illustrating example objects.
Figure 6:
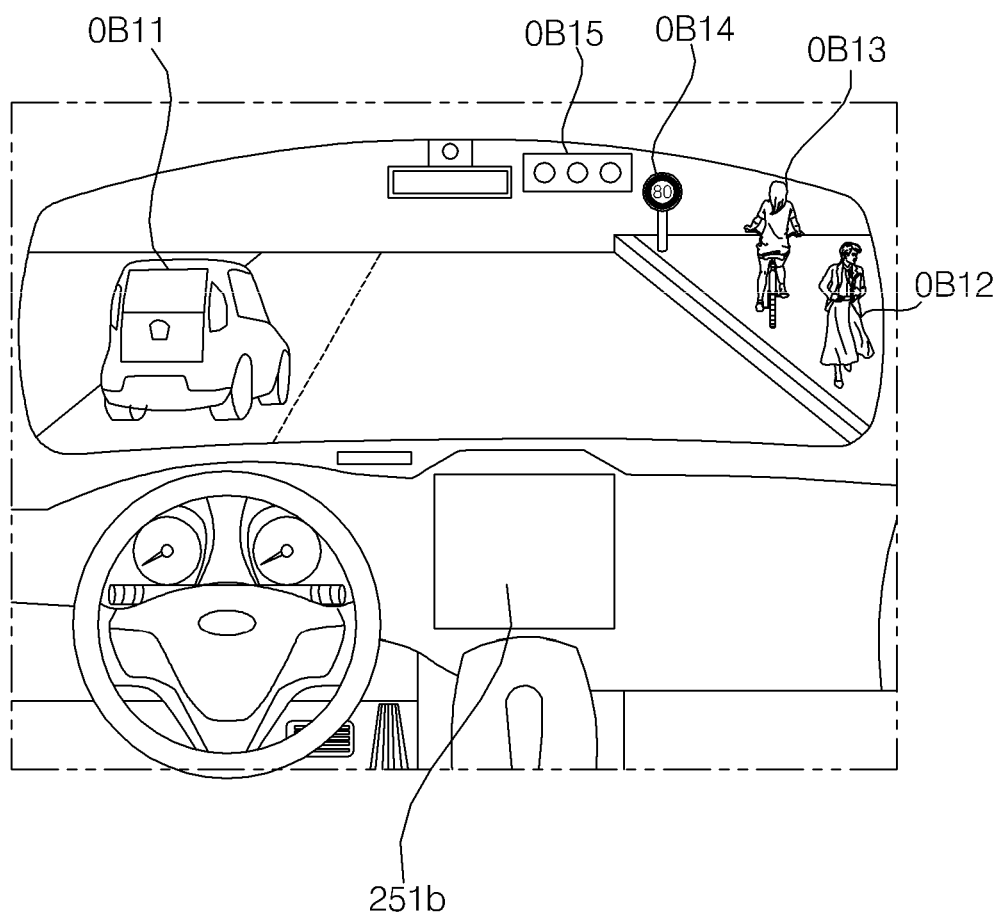

FIG. 5 and FIG. 6 are reference diagrams illustrating example objects.

Figure 7:
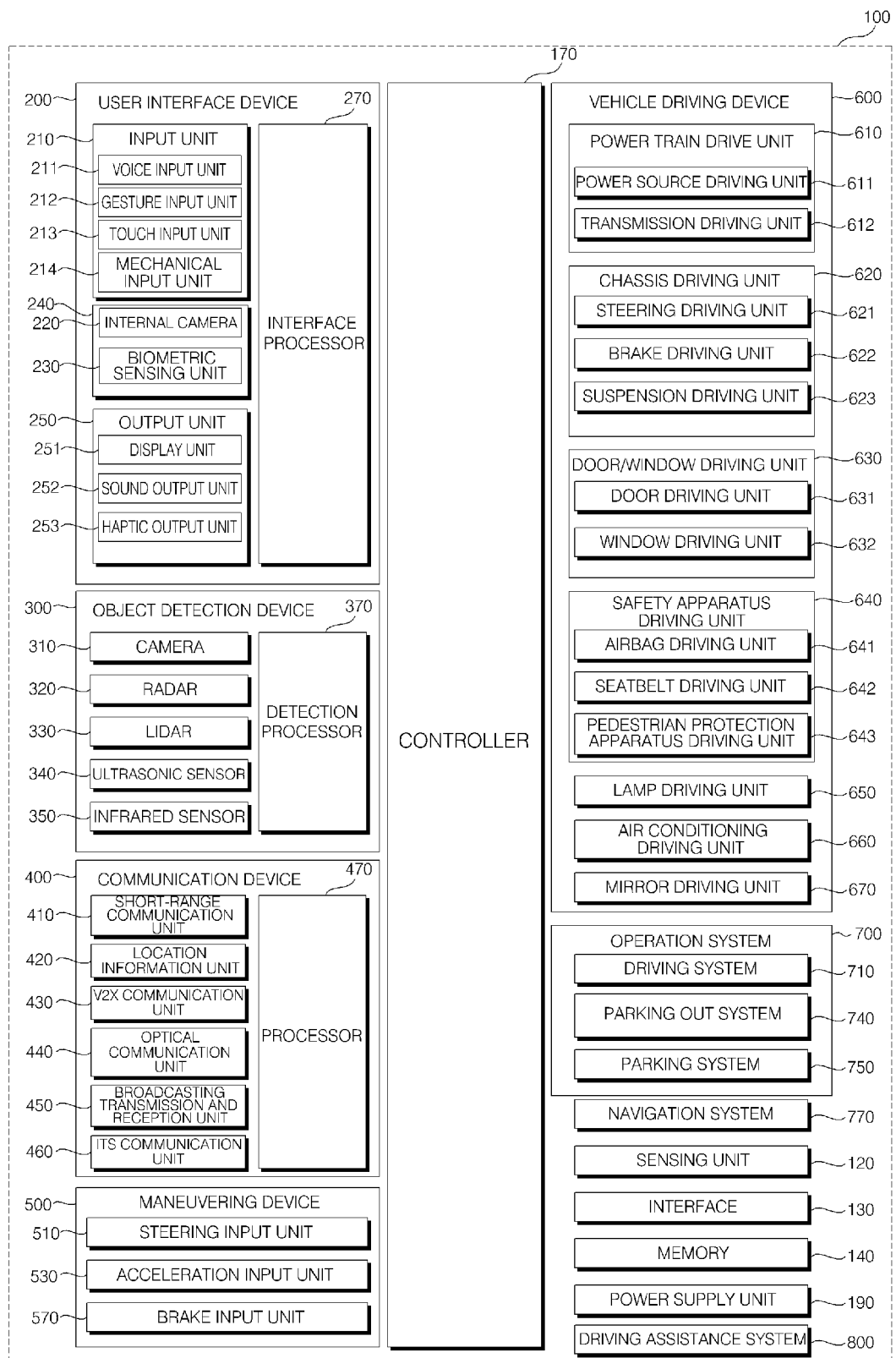
FIG. 7 is a block diagram of example components of an example vehicle.

FIG. 7 is a block diagram illustrating an example vehicle.

Referring to FIGS. 1 to 7, a vehicle 100 may include a wheel rotated by a power source, and a steering input unit 510 for adjusting the running direction of the vehicle 100.

The vehicle 100 may be an autonomous vehicle.

The vehicle 100 may be switched to an autonomous mode or a manual mode, based on a user input.

For example, the vehicle 100 may be switched from the manual mode to the autonomous mode, or switched from the autonomous mode to the manual mode, based on a received user input, via a user interface device 200.

The vehicle 100 may be switched to the autonomous mode or the manual mode, based on traveling situation information.

The traveling situation information may include at least one of information on object outside the vehicle, navigation information, and vehicle state information.

For example, the vehicle 100 may be switched from the manual mode to the autonomous mode or switched from the autonomous mode to the manual mode, based on the traveling situation information generated by an object detection unit 300.

For example, the vehicle 100 may be switched from the manual mode to the autonomous mode or switched from the autonomous mode to the manual mode, based on the traveling situation information received via a communication unit 400.

The vehicle 100 may be switched from the manual mode to the autonomous mode or may be switched from the autonomous mode to the manual mode, based on the information, data and signals provided from an external device.

When the vehicle 100 is driven in the autonomous mode, the autonomous vehicle 100 may be driven based on an operation system 700.

For example, the autonomous vehicle 100 may be driven based on information, data, or signals generated in a traveling system 710, a parking out system 740, and a parking system 750.

When the vehicle 100 is driven in the manual mode, the autonomous vehicle 100 may receive a user input for driving through a maneuvering device 500. Based on the user input received through the maneuvering device 500, the vehicle 100 may be driven.

An overall length is a length from a front portion to a rear portion of the vehicle 100, a width is a breadth of the vehicle 100, and a height is a length from the bottom of the wheel to a roof thereof. In the following description, it is assumed that an overall length direction L is a reference direction in which the overall length of the vehicle 100 is measured, a width direction W is a reference direction in which the width of the vehicle 100 is measured, and a height direction H is a reference direction in which the height of the vehicle 100 is measured.

As illustrated in FIG. 7, the vehicle 100 may include the user interface device 200, the object detection unit 300, the communication unit 400, the maneuvering device 500, a vehicle driving device 600, the operation system 700, a navigation system 770, a sensing unit 120, an interface 130, a memory 140, a controller 170, a power supply unit 190, and a driving assistance system 800.

In some implementations, the vehicle 100 may further include other components in addition to the components described herein, or may not include some of the components described.

The user interface device 200 is a unit for communicating between the vehicle 100 and a user. The user interface device 200 may receive a user input and provide the user with information generated in the vehicle 100. The vehicle 100 may implement user interfaces (UI) or user experience (UX) through the user interface device 200.

The user interface device 200 may include an input unit 210, an internal camera 220, a biometric sensing unit 230, an output unit 250, and a processor 270.

In some implementations, the user interface device 200 may further include other components in addition to the components described herein, or may not include some of the components described.

The input unit 210 is an element for receiving information from a user. The data collected by the input unit 210 may be analyzed by the processor 270 and processed by a user's control command.

The input unit 210 may be disposed inside the vehicle. For example, the input unit 210 may include a certain area of a steering wheel, a certain area of an instrument panel, a certain area of a seat, a certain area of each pillar, a certain area of a door, a certain area of a center console, a certain area of a head lining, a certain area of a sun visor, a certain area of a windshield, a certain area of a window, or the like.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert user's gesture input to an electrical signal. The converted electrical signal may be provided to the processor 270 or the controller 170.

The gesture input unit 212 may include at least one of an infrared sensor and an image sensor for sensing user's gesture input.

In some implementations, the gesture input unit 212 may sense user's three-dimensional gesture input. To this end, the gesture input unit 212 may include a light output unit for outputting a plurality of infrared rays or a plurality of image sensors.

The gesture input unit 212 may sense user's three-dimensional gesture input through a time of flight (TOF) method, a structured light method, or a disparity method.

The touch input unit 213 may convert the touch input of a user into an electrical signal. The converted electrical signal may be provided to the processor 270 or the controller 170.

The touch input unit 213 may include a touch sensor for sensing the touch input of a user.

In some implementations, the touch input unit 213 may be integrated with a display unit 251 to implement a touch screen. Such a touch screen may provide an input interface between the vehicle 100 and a user and an output interface simultaneously.

The mechanical input unit 214 may include at least one of a button, a dome switch, a jog wheel, and a jog switch. The electrical signal generated by the mechanical input unit 214 may be provided to the processor 270 or the controller 170.

The mechanical input unit 214 may be disposed in a steering wheel, a center fascia, a center console, a cockpit module, a door, or the like.

The internal camera 220 may acquire an in-vehicle image. The processor 270 may detect the state of a user based on the in-vehicle image. The processor 270 may acquire user's gaze information from the in-vehicle image. The processor 270 may detect user's gesture in the in-vehicle image.

The biometric sensing unit 230 may acquire biometric information of a user. The biometric sensing unit 230 may include a sensor capable of acquiring the biometric information of the user, and may acquire fingerprint information, heartbeat information, and the like of the user using the sensor. The biometric information may be used for user authentication.

The output unit 250 is an element for generating an output related to vision, auditory, tactile sense, or the like.

The output unit 250 may include at least one of a display unit 251, a sound output unit 252, and a haptic output unit 253.

The display unit 251 may display graphic objects corresponding to various information.

The display unit 251 may include at least one of a liquid crystal display (LCD), a thin film transistor-liquid crystal display (TFT LCD), an organic light-emitting diode (OLED), a flexible display, a 3D display, and an e-ink display.

The display unit 251 may achieve a mutual layer structure with the touch input unit 213 or may be integrally formed to implement a touch screen.

The display unit 251 may be implemented as a Head Up Display (HUD). When the display unit 251 is implemented as an HUD, the display unit 251 may include a projection module to output information through an image projected on a windshield or a window.

The display unit 251 may include a transparent display. The transparent display may be attached to a windshield or window.

The transparent display may display a certain screen while having a certain transparency. In order to have transparency, the transparent display may include at least one of a transparent thin film electroluminescent (TFEL), a transparent organic light-emitting diode (OLED), a transparent liquid crystal display (LCD), a transmissive transparent display, and a transparent light emitting diode (LED) display. The transparency of the transparent display may be adjusted.

In some implementations, the user interface device 200 may include a plurality of display units 251 at a plurality of areas 251a to 251g.

The display unit 251 may be disposed in a certain area of the steering wheel, a certain area 251a, 251b, and 251e of the instrument panel, a certain area 251d of the seat, a certain area 251f of each pillar, a certain area 251g of the door, a certain area of the center console, a certain area of the head lining, and a certain area of the sun visor, or may be implemented in a certain area 251c of the windshield, and a certain area 251h of the window.

The sound output unit 252 may convert an electric signal provided from the processor 270 or the controller 170 into an audio signal and output the audio signal. To this end, the sound output unit 252 may include one or more speakers.

The haptic output unit 253 may generate a tactile output. For example, the haptic output unit 253 may operate to vibrate the steering wheel, a safety belt, the seat 110FL, 110FR, 110RL, and 110RR so that a user can recognize an output.

The processor 270 may control the overall operation of each unit of the user interface device 200.

In some implementations, the user interface device 200 may include a plurality of processors 270, or may not include a processor 270.

When the user interface device 200 does not include the processor 270, the user interface device 200 may be operated under the control of a processor of another unit in the vehicle 100 or the controller 170.

In some implementations, the user interface device 200 may be referred to as a vehicle display unit.

The user interface device 200 may be operated under the control of the controller 170.

The object detection unit 300 is an apparatus for detecting an object located outside the vehicle 100. The object detection unit 300 may generate object information based on sensing data.

The object information may include information on whether object exists, location information of object, distance information between vehicle 100 and object, and relative speed information between vehicle 100 and object.

The object may be various objects related to the driving of the vehicle 100.

Referring to FIG. 5 to FIG. 6, an object O may include a lane OB10, other vehicle OB11, a pedestrian OB12, a two-wheeler OB13, a traffic signal OB14 and OB15, a light, a road, a structure, a speed bump, a terrain, an animal, and the like.

The lane OB10 may be a travelling lane, a side lane of the travelling lane, and a lane on which an opposed vehicle travels. The lane OB10 may include left and right lines forming a lane. A lane may include an intersection.

The other vehicle OB11 may be a vehicle traveling around the vehicle 100. The other vehicle may be a vehicle located within a certain distance from the vehicle 100. For example, the other vehicle OB11 may be a vehicle preceding or following the vehicle 100.

The pedestrian OB12 may be a person located around the vehicle 100. The pedestrian OB12 may be a person located within a certain distance from the vehicle 100. For example, the pedestrian OB12 may be a person located on a sidewalk or a driveway.

The two-wheeler OB13 may be a conveyance located around the vehicle 100 and moves using two wheels. The two-wheeler OB13 may be a conveyance having two wheels located within a certain distance from the vehicle 100. For example, the two-wheeler OB13 may be a motorcycle or a bicycle located on a sidewalk or a driveway.

The traffic signal may include a traffic light (OB15), a traffic sign (OB14), and a pattern or text drawn on a road surface.

The light may be light generated from a lamp provided in other vehicle. The light may be a light generated from a street light. The light may be a solar light.

The road may include a road surface, a curve, a slope such as an ascent, a descent, and the like.

The structure may be an object located around the road and fixed to the ground. For example, the structure may include a street light, a street tree, a building, a telephone pole, a traffic light, a bridge, a curb, and a wall.

The terrain may include mountains, hills, and the like.

In some implementations, an object may be classified into a moving object and a fixed object. For example, the moving object may include a moving other vehicle, and a moving pedestrian. For example, the fixed object may include a traffic signal, a road, a structure, a stopped other vehicle, and a stopped pedestrian.

The object detection unit 300 may include a camera 310, a radar 320, a Light Detection and Ranging device (LIDAR) 330, an ultrasonic sensor 340, an infrared sensor 350, and a processor 370.

In some implementations, the object detection unit 300 may further include other components in addition to the described components, or may not include some of the described components.

The camera 310 may be located in an appropriate position outside the vehicle to acquire an external image of the vehicle. The camera 310 may be a monocular camera, a stereo camera 310a, an around view monitoring (AVM) camera 310b, or a 360-degree camera.

The camera 310 may acquire information on a location of object, information on distance to object, or information on relative speed with object, by using various image processing algorithms.

For example, the camera 310 may acquire the information on distance to object and the information on relative speed with object, based on a change in an object size over time, from the acquired image.

For example, the camera 310 may acquire the information on distance to object and the information on relative speed with object, through a pin hole model, a road surface profiling, and the like.

For example, the camera 310 may acquire the information on distance to object and the information on relative speed with object, based on disparity information in the stereo image acquired by the stereo camera 310a.

For example, the camera 310 may be disposed, in the interior of the vehicle, close to a front windshield, so as to acquire an image ahead of the vehicle. Alternatively, the camera 310 may be disposed around a front bumper or radiator grille.

For example, the camera 310 may be disposed, in the interior of the vehicle, close to a rear glass, so as to acquire an image behind the vehicle. Alternatively, the camera 310 may be disposed around a rear bumper, a trunk, or a tailgate.

For example, the camera 310 may be disposed, in the interior of the vehicle, close to at least one of the side windows so as to acquire an image of the side of the vehicle. Alternatively, the camera 310 may be disposed around a side mirror, a fender, or a door.

The camera 310 may provide the acquired image to the processor 370.

The radar 320 may include an electromagnetic wave transmitting unit and an electromagnetic wave receiving unit. The radar 320 may be implemented by a pulse radar method or a continuous wave radar method in terms of the radio wave emission principle.

The radar 320 may be implemented by a frequency modulated continuous wave (FMCW) method or a frequency shift keying (FSK) method according to a signal waveform among a continuous wave radar method.

The radar 320 may detect an object based on a time-of-flight (TOF) method or a phase-shift method through an electromagnetic wave, and detect the location of the detected object, the distance to the detected object, and the relative speed with the detected object.

The radar 320 may be disposed in an appropriate position outside the vehicle to detect an object located at the front, rear, or side of the vehicle.

The LIDAR 330 may include a laser transmitting unit and a laser receiving unit. The LIDAR 330 may be implemented in the time-of-flight (TOF) method or the phase-shift method.

The LIDAR 330 may be implemented in a driving type or a non-driving type.

When implemented in the driving type, the LIDAR 330 may be rotated by a motor and may detect an object around the vehicle 100.

When implemented in the non-driving type, the LIDAR 330 may detect an object located within a certain range based on the vehicle 100 by optical steering. The vehicle 100 may include a plurality of non-driving type LIDARs 330.

The LIDAR 330 may detect an object based on the time-of-flight (TOF) method or the phase-shift method, through a laser light, and detect the location of the detected object, the distance to the detected object, and the relative speed with the detected object.

The LIDAR 330 may be disposed in an appropriate position outside the vehicle to detect an object located at the front, rear, or side of the vehicle.

The ultrasonic sensor 340 may include an ultrasonic transmitting unit and an ultrasonic receiving unit. The ultrasonic sensor 340 may detect the object based on an ultrasonic wave, and may detect the location of the detected object, the distance to the detected object, and the relative speed with the detected object.

The ultrasonic sensor 340 may be disposed in an appropriate position outside the vehicle to detect an object located at the front, rear, or side of the vehicle.

The infrared sensor 350 may include an infrared ray transmitting unit and an infrared ray receiving unit. The infrared sensor 350 may detect the object based on an infrared ray, and may detect the location of the detected object, the distance to the detected object, and the relative speed with the detected object.

The infrared sensor 350 may be disposed in an appropriate position outside the vehicle to detect an object located at the front, rear, or side of the vehicle.

The processor 370 may control the overall operation of each unit of the object detection unit 300.

The processor 370 may compare data sensed by the camera 310, the radar 320, the LIDAR 330, the ultrasonic sensor 340, and the infrared sensor 350 with pre-stored data to detect or classify the object.

The processor 370 may detect and track the object based on the acquired image. The processor 370 may perform operations such as calculating a distance to object, calculating a relative speed with object, and the like through an image processing algorithm.

For example, the processor 370 may acquire information on distance to object, or information on relative speed with object, based on a change in an object size over time, form the acquired image.

For example, the processor 370 may acquire the information on distance to object, or the information on relative speed with object through a pin hole model, a road surface profiling, and the like.

For example, the processor 370 may acquire the information on distance to object, or the information on relative speed with object based on disparity information in a stereo image acquired by the stereo camera 310a.

The processor 370 may detect and track an object based on a reflected electromagnetic wave which is a transmitted electromagnetic wave that is reflected by the object and returned. The processor 370 may perform operations such as calculating a distance to the object and calculating a relative speed with the object based on the electromagnetic wave.

The processor 370 may detect and track an object based on a reflected laser light which is a transmitted electromagnetic laser that is reflected by the object and returned. The processor 370 may perform operations such as calculating a distance to the object and calculating a relative speed with the object based on the laser light.

The processor 370 may detect and track an object based on a reflected ultrasonic wave which is a transmitted ultrasonic wave that is reflected by the object and returned. The processor 370 may perform operations such as calculating a distance to the object and calculating a relative speed with the object based on the ultrasonic wave.

The processor 370 may detect and track an object based on a reflected infrared light which is a transmitted infrared light that is reflected by the object and returned. The processor 370 may perform operations such as calculating a distance to the object and calculating a relative speed with the object based on the infrared light.

In some implementations, the object detection unit 300 may include a plurality of processors 370 or may not include the processor 370. For example, each of the camera 310, the radar 320, the LIDAR 330, the ultrasonic sensor 340, and the infrared sensor 350 may individually include a processor.

The object detection unit 300 may be operated under the control of a processor of a unit in the vehicle 100 or the controller 170, when the object detection unit 300 does not include the processor 370.

The object detection unit 300 may be operated under the control of the controller 170.

The communication unit 400 is a unit for performing communication with an external device. Here, the external device may be other vehicle, a mobile terminal, or a server.

The communication unit 400 may include at least one of a transmission antenna, a reception antenna, a radio frequency (RF) circuit capable of implementing various communication protocols, and a RF device, so as to accomplish communication.

The communication unit 400 may include a short-range communication unit 410, a location information unit 420, a V2X communication unit 430, an optical communication unit 440, a broadcast transmission/reception unit 450, an intelligent transport systems (ITS) communication unit 460, and a processor 470.

In some implementations, the communication unit 400 may further include other components in addition to the described components, or may not include some of the described components.

The short-range communication unit 410 is a unit for short-range communication. The short-range communication unit 410 may support a short-range communication by using at least one of Bluetooth™, Radio Frequency Identification (RFID), Infrared Data Association (IrDA), Ultra-Wideband (UWB), ZigBee, Near Field Communication (NFC) Wireless-Fidelity (Wi-Fi), Wi-Fi Direct, and Wireless Universal Serial Bus (Wireless USB) technologies.

The short-range communication unit 410 may form short-range wireless area networks to perform short-range communication between the vehicle 100 and at least one external device.

The location information unit 420 is a unit for acquiring location information of the vehicle 100. For example, the location information unit 420 may include a Global Positioning System (GPS) module or a Differential Global Positioning System (DGPS) module.

The V2X communication unit 430 is a unit for performing wireless communication with a server (V2I: Vehicle to Infra), other vehicle (V2V: Vehicle to Vehicle), or a pedestrian (V2P: Vehicle to Pedestrian). The V2X communication unit 430 may include an RF circuit capable of implementing protocols for communication with infra (V2I), inter-vehicle communication (V2V), and communication with pedestrian (V2P).

The optical communication unit 440 is a unit for performing communication with an external device through light. The optical communication unit 440 may include a light transmitting unit that converts an electric signal into an optical signal and transmits the optical signal to the outside, and a light receiving unit that converts a received optical signal into an electric signal.

In some implementations, the light transmitting unit may be formed to be integrated with a lamp included in the vehicle 100.

The broadcast transmission/reception unit 450 is a unit for receiving a broadcast signal from an external broadcast management server through a broadcast channel or transmitting a broadcast signal to a broadcast management server. The broadcast channel may include a satellite channel and a terrestrial channel. The broadcast signal may include a TV broadcast signal, a radio broadcast signal, and a data broadcast signal.

The ITS communication unit 460 may exchange information, data or signals with a traffic system. The ITS communication unit 460 may provide acquired information and data to the traffic system. The ITS communication unit 460 may receive information, data, or signals from the traffic system. For example, the ITS communication unit 460 may receive road traffic information from the traffic system and provide it to the controller 170. For example, the ITS communication unit 460 may receive a control signal from the traffic system and provide it to the controller 170 or a processor provided in the vehicle 100.

The processor 470 may control the overall operation of each unit of the communication unit 400.

In some implementations, the communication unit 400 may include a plurality of processors 470 or may not include processor 470.

When the processor 470 is not included in the communication unit 400, the communication unit 400 may be operated under the control of a processor of other unit in the vehicle 100 or the controller 170.

In some implementations, the communication unit 400 may implement a vehicle display apparatus together with the user interface device 200. In this case, the vehicle display apparatus may be referred to as a telematics apparatus or an audio video navigation (AVN) apparatus.

The communication unit 400 may be operated under the control of the controller 170.

The maneuvering device 500 is a unit for receiving a user input for driving.

In a manual mode, the vehicle 100 may be driven based on a signal provided by the maneuvering device 500.

The maneuvering device 500 may include a steering input unit 510, an acceleration input unit 530, and a brake input unit 570.

The steering input unit 510 may receive a traveling direction input of the vehicle 100 from a user. The steering input unit 510 may be formed in a wheel shape so that steering input may be performed by rotation. In some implementations, the steering input unit may be formed as a touch screen, a touch pad, or a button.

The acceleration input unit 530 may receive an input for acceleration of the vehicle 100 from the user. The brake input unit 570 may receive an input for deceleration of the vehicle 100 from the user. The acceleration input unit 530 and the brake input unit 570 may be formed in a pedal shape. In some implementations, the acceleration input unit or the brake input unit may be formed as a touch screen, a touch pad, or a button.

The maneuvering device 500 may be operated under the control of the controller 170.

The vehicle driving device 600 is an apparatus for electrically controlling the driving of various units in the vehicle 100.

The vehicle driving device 600 may include a power train driving unit 610, a chassis driving unit 620, a door/window driving unit 630, a safety apparatus driving unit 640, a lamp driving unit 650, an air conditioning driving unit 660, and a mirror driving unit 670.

In some implementations, the vehicle driving device 600 may further include other components in addition to the described components, or may not include some of the described components.

In some implementations, the vehicle driving device 600 may include a processor. Each unit of the vehicle driving device 600 may individually include a processor.

The power train driving unit 610 may control the operation of a power train apparatus.

The power train driving unit 610 may include a power source driving unit 611 and a transmission driving unit 612.

The power source driving unit 611 may perform a control of a power source of the vehicle 100.

For example, when a fossil fuel-based engine is a power source, the power source driving unit 611 may perform electronic control of the engine. Thus, the output torque of the engine and the like may be controlled. The power source driving unit 611 may adjust the engine output torque under the control of the controller 170.

For example, when an electric energy based motor is a power source, the power source driving unit 611 may perform control of the motor. The power source driving unit 611 may adjust the rotation speed, the torque, and the like of the motor under the control of the controller 170.

The transmission driving unit 612 may perform control of a transmission.

The transmission driving unit 612 may adjust the state of the transmission. The transmission driving unit 612 may adjust the state of the transmission to driving (D), reverse (R), neutral (N), or parking (P).

In some implementations, when the engine is a power source, the transmission driving unit 612 may adjust a gear engagement state in the driving (D) state.

The chassis driving unit 620 may control the operation of a chassis apparatus.

The chassis driving unit 620 may include a steering driving unit 621, a brake driving unit 622, and a suspension driving unit 623.

The steering driving unit 621 may perform electronic control of a steering apparatus in the vehicle 100. The steering driving unit 621 may change the traveling direction of the vehicle.

The brake driving unit 622 may perform electronic control of a brake apparatus in the vehicle 100. For example, it is possible to reduce the speed of the vehicle 100 by controlling the operation of a brake disposed in a wheel.

In some implementations, the brake driving unit 622 may individually control each of a plurality of brakes. The brake driving unit 622 may control the braking forces applied to the plurality of wheels to be different from each other.

The suspension driving unit 623 may perform electronic control of a suspension apparatus in the vehicle 100. For example, when there is a curvature on the road surface, the suspension driving unit 623 may control the suspension apparatus so as to reduce the vibration of the vehicle 100.

In some implementations, the suspension driving unit 623 may individually control each of the plurality of suspensions.

The door/window driving unit 630 may perform electronic control of a door apparatus or a window apparatus in the vehicle 100.

The door/window driving unit 630 may include a door driving unit 631 and a window driving unit 632.

The door driving unit 631 may control the door apparatus. The door driving unit 631 may control the opening and closing of a plurality of doors included in the vehicle 100. The door driving unit 631 may control the opening or closing of a trunk or a tail gate. The door driving unit 631 may control the opening or closing of a sunroof.

The window driving unit 632 may perform electronic control of the window apparatus. It is possible to control the opening or closing of a plurality of windows included in the vehicle 100.

The safety apparatus driving unit 640 may perform electronic control of various safety apparatuses in the vehicle 100.

The safety apparatus driving unit 640 may include an airbag driving unit 641, a seatbelt driving unit 642, and a pedestrian protection apparatus driving unit 643.

The airbag driving unit 641 may perform electronic control of an airbag apparatus in the vehicle 100. For example, the airbag driving unit 641 may control an airbag to be unfolded when a danger is detected.

The seatbelt driving unit 642 may perform electronic control of a seatbelt apparatus in the vehicle 100. For example, the seatbelt driving unit 642 may control a passenger to be fixed to the seats 110FL, 110FR, 110RL, and 110RR using a seatbelt when a danger is detected.

The pedestrian protection apparatus driving unit 643 may perform electronic control of a hood lift and a pedestrian airbag. For example, the pedestrian protection apparatus driving unit 643 may control the hood lift-up and the pedestrian airbag unfoldment when a collision with a pedestrian is detected.

The lamp driving unit 650 may perform electronic control of various lamp apparatuses in the vehicle 100. The air conditioning driving unit 660 may perform electronic control of an air conditioner in the vehicle 100. For example, when the temperature inside the vehicle is high, the air conditioning driving unit 660 may control the air conditioner to operate so that cool air is supplied to the inside of the vehicle.

The vehicle driving device 600 may include a processor. Each unit of the vehicle driving device 600 may individually include a processor.

The mirror driving unit 670 may drive at least one mirror provided in the vehicle including a side mirror 110 and a rearview mirror.

The mirror driving unit 670 may drive the side mirror 110 to be folded and unfolded.

The vehicle driving device 600 may be operated under the control of the controller 170.

The operation system 700 is a system for controlling various driving of the vehicle 100. The operation system 700 may be operated in the autonomous mode.

The operation system 700 may include the traveling system 710, the parking out system 740, and the parking system 750.

In some implementations, the operation system 700 may further include other components in addition to the described components, or may not include some of the described components.

In some implementations, the operation system 700 may include a processor. Each unit of the operation system 700 may individually include a processor.

In some implementations, when the operation system 700 is implemented in software, it may be a sub-concept of the controller 170.

In some implementations, the operation system 700 may include at least one of the user interface device 200, the object detection unit 300, the communication unit 400, the maneuvering device 500, the vehicle driving device 600, the navigation system 770, the sensing unit 120, and the controller 170.

The traveling system 710 may perform the traveling of the vehicle 100.

The traveling system 710 may receive navigation information from the navigation system 770 and provide a control signal to the vehicle driving device 600 to perform the traveling of the vehicle 100.

The traveling system 710 may receive object information from the object detection unit 300 and provide a control signal to the vehicle driving device 600 to perform the traveling of the vehicle 100.

The traveling system 710 may receive a signal from an external device via the communication unit 400 and provide a control signal to the vehicle driving device 600 to perform the traveling of the vehicle 100.

The traveling system 710 may be a system that includes at least one of the user interface device 200, the object detection unit 300, the communication unit 400, the maneuvering device 500, the vehicle driving device 600, the navigation system 770, the sensing unit 120, and the controller 170 to perform the traveling of the vehicle 100.

Such a traveling system 710 may be referred to as a vehicle traveling control unit.

The parking out system 740 may perform the parking out of the vehicle 100.

The parking out system 740 may receive the navigation information from the navigation system 770 and provide a control signal to the vehicle driving device 600 to perform the parking out of the vehicle 100.

The parking out system 740 may receive object information from the object detection unit 300 and provide a control signal to the vehicle driving device 600 to perform the parking out of the vehicle 100.

The parking out system 740 may receive a signal from an external device via the communication unit 400 and provide a control signal to the vehicle driving device 600 to perform the parking out of the vehicle 100.

The parking out system 740 may be a system that includes at least one of the user interface device 200, the object detection unit 300, the communication unit 400, the maneuvering device 500, the vehicle driving device 600, the navigation system 770, the sensing unit 120, and the controller 170 to perform the parking out of the vehicle 100.

Such a parking out system 740 may be referred to as a vehicle parking out control unit.

The parking system 750 may perform parking of the vehicle 100.

The parking system 750 may receive the navigation information from the navigation system 770 and provide a control signal to the vehicle driving device 600 to perform parking of the vehicle 100.

The parking system 750 may receive object information from the object detection unit 300 and provide a control signal to the vehicle driving device 600 to perform parking of the vehicle 100.

The parking system 750 may receive a signal from an external device via the communication unit 400 and provide a control signal to the vehicle driving device 600 to perform parking of the vehicle 100.

The parking system 750 may be a system that includes at least one of the user interface device 200, the object detection unit 300, the communication unit 400, the maneuvering device 500, the vehicle driving device 600, the navigation system 770, the sensing unit 120, and the controller 170 to perform parking of the vehicle 100.

Such a parking system 750 may be referred to as a vehicle parking control unit.

The navigation system 770 may provide navigation information. The navigation information may include at least one of map information, set destination information, route information according to the destination setting, information related to various objects on a route, lane information, and current position information of vehicle.

The navigation system 770 may include a memory and a processor. The memory may store the navigation information. The processor may control the operation of the navigation system 770.

In some implementations, the navigation system 770 may receive information from an external device via the communication unit 400 and may update pre-stored information.

In some implementations, the navigation system 770 may be classified as a subcomponent of the user interface device 200.

The sensing unit 120 may sense the state of the vehicle. The sensing unit 120 may include an inertial navigation unit (IMU) sensor, a collision sensor, a wheel sensor, a speed sensor, a tilt sensor, a weight sensor, a heading sensor, a position module, a vehicle forward/reverse sensor, a battery sensor, a fuel sensor, a tire sensor, a steering sensor for steering wheel rotation, a vehicle interior temperature sensor, a vehicle interior humidity sensor, an ultrasonic sensor, an illumination sensor, an accelerator pedal position sensor, a brake pedal position sensor, and the like.

In some implementations, the inertial navigation unit (IMU) sensor may include at least one of an acceleration sensor, a gyro sensor, and a magnetic sensor.

The sensing unit 120 may acquire a sensing signal relating to vehicle posture information, vehicle motion information, vehicle yaw information, vehicle roll information, vehicle pitch information, vehicle collision information, vehicle direction information, vehicle position information (GPS information), vehicle angle information, vehicle speed information, vehicle acceleration information, vehicle tilt information, vehicle forward/backward information, battery information, fuel information, tire information, vehicle lamp information, vehicle interior temperature information, vehicle interior humidity information, steering wheel rotation angle, vehicle exterior illumination, pressure applied to the accelerator pedal, pressure applied to the brake pedal, and the like.

The sensing unit 120 may further include an accelerator pedal sensor, a pressure sensor, an engine speed sensor, an air flow sensor (AFS), an air temperature sensor (ATS), a water temperature sensor WTS, a throttle position sensor (TPS), a TDC sensor, a crank angle sensor (CAS), and the like.

The sensing unit 120 may generate vehicle state information, based on the sensing data. The vehicle state information may be information generated based on data sensed by various sensors provided in the vehicle.

For example, the vehicle state information may include posture information of vehicle, speed information of vehicle, tilt information of vehicle, weight information of vehicle, direction information of vehicle, battery information of vehicle, fuel information of vehicle, tire pressure information of vehicle, steering information of vehicle, vehicle interior temperature information, vehicle interior humidity information, pedal position information, vehicle engine temperature information, and the like.

The interface 130 may serve as a passage to various external devices connected to the vehicle 100. For example, the interface 130 may include a port that can be connected to a mobile terminal, and may be connected to the mobile terminal through the port. In this case, the interface 130 may exchange data with the mobile terminal.

In some implementations, the interface 130 may serve as a passage for supplying electrical energy to the connected mobile terminal. When the mobile terminal is electrically connected to the interface 130, the interface 130 may provide the mobile terminal with electric energy supplied from the power supply unit 190, under the control of the controller 170.

The memory 140 may be electrically connected to the controller 170. The memory 140 may store basic data for a unit, control data for controlling the operation of the unit, and input/output data. The memory 140 may be, in hardware, various storage units such as a ROM, a RAM, an EPROM, a flash drive, a hard drive, and the like. The memory 140 may store various data for the overall operation of the vehicle 100, such as a program for processing or controlling the controller 170.

In some implementations, the memory 140 may be formed integrally with the controller 170 or may be implemented as a subcomponent of the controller 170. The controller 170 may control the overall operation of each unit in the vehicle 100. The controller 170 may be referred to as an electronic control unit (ECU).

The power supply unit 190 may supply power necessary for operation of each component, under the control of the controller 170. For example, the power supply unit 190 may receive power from a battery or the like inside the vehicle.

One or more processors and the controller 170 included in the vehicle 100 may be implemented using at least one of application specific integrated circuits (ASICs), digital signal processors (DSPs), digital signal processing devices (DSPDs), programmable logic devices (PLDs) field programmable gate arrays (FPGAs), processors, controllers, micro-controllers, microprocessors, and other electrical units for performing other functions.

Figure 8:
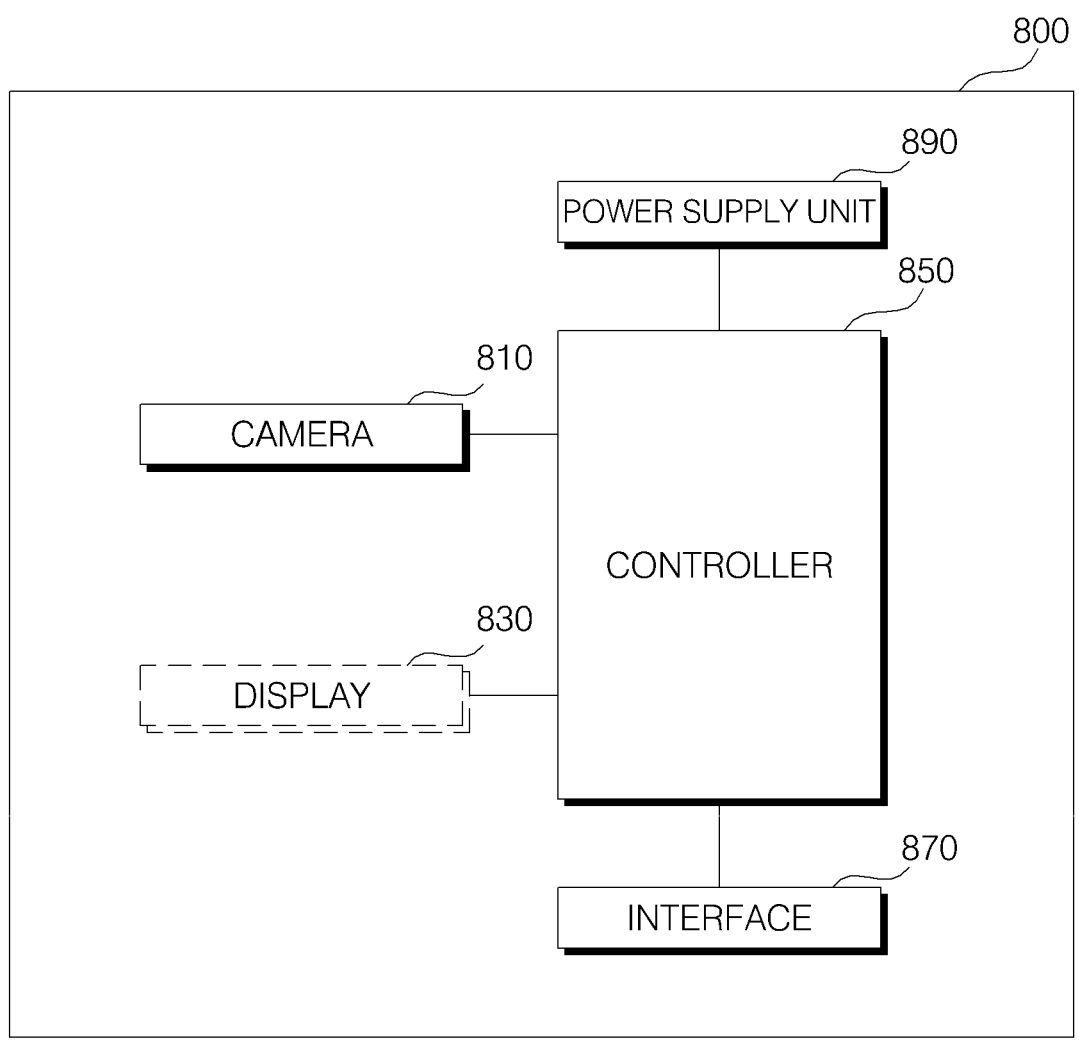
FIG. 8 is a block diagram of example components of an example driving assistance system.

FIG. 8 is a block diagram illustrating an example driving assistance system.

The driving assistance system 800 is a system for assisting various operations of the vehicle 100. The driving assistance system 800 may be operated in a manual mode or an autonomous mode.

Referring to FIG. 8, the driving assistance system 800 may include a camera 810, a controller 850, an interface 870, and a power supply unit 890.

In some implementations, the driving assistance system 800 may include a display 830.

In some implementations, the driving assistance system 800 may further include other components in addition to the described components, or may not include some of the described components.

In some implementations, the driving assistance system 800 may include a single controller 850, or each unit of the driving assistance system 800 may include a processor individually. In some cases, the driving assistance system 800 may include a plurality of controllers 850, or each unit of the driving assistance system 800 may include a plurality of controllers.

The driving assistance system 800 may be a system that uses the camera 310, the controller 170, the interface 130, and the display unit 251 provided in the vehicle 100 so as to assist the vehicle driving.

The driving assistance system 800 may be implemented as a separate hardware in the vehicle 100, but may refer to a bundle of components provided in the vehicle 100.

The camera 810 may be a camera 310 included in the object detection unit 300. The camera 810 may be provided separately from the camera 310 included in the object detection unit 300.

The camera 810 may be disposed on a mounting apparatus having an end, which is rotatably installed in the vehicle 100 and rotates based on a rotation axis, and may be spaced apart from the rotation axis.

The mounting apparatus having one end rotatably installed in the vehicle 100 may be provided on the outer side of the vehicle 100, so that the other end of the mounting apparatus can be rotated while being protruded outside the vehicle body.

For example, the mounting apparatus having an end rotatably installed in the vehicle 100 may be a side mirror 110 of the vehicle 100.

For another example, the mounting apparatus having an end rotatably installed in the vehicle 100 may be a front door 105 of the left side or right side of the vehicle 100.

The mounting apparatus having an end rotatably installed in the vehicle 100 may be a rear door of the left side or right side of the vehicle 100.

The mounting apparatus having an end rotatably installed in the vehicle 100 may be any one as long as it is rotatably installed in the vehicle 100 and rotates based on the rotation axis, in addition to the above mentioned side mirror 110, and front door 105. An example where the mounting apparatus is the side mirror 110 and the case where the mounting apparatus is the front door 105 will be described below.

However, the scope of the present disclosure is not limited thereto. The present disclosure may be similarly applied to a case where the mounting apparatus having one end rotatably installed in the vehicle 100 is not the side mirror 110 and the front door 105.

The side mirror 110 may have one end that is rotatably installed in the vehicle 100, and may rotate based on the rotation axis.

The side mirror 110 may be provided in such a manner that the rotation axis may be perpendicular to the ground or may form an angle with the direction perpendicular to the ground depending on a type of the vehicle 100.

In some implementations, the side mirror 110 may be rotated by the rotation of the front door 105 provided with the side mirror 110. In this case, the side mirror 110 may rotate based on the rotation axis of the front door 105.

Even when the front door 105 provided with the side mirror 110 rotates, as in the case where the side mirror 110 is rotated while the front door 105 is fixed, the description.

The side mirror 110 may rotate based on the rotation axis so that the angle of the side mirror 110 with respect to the front-rear direction of the vehicle 100 may be in a range from 0 to 90 degrees. The side mirror 110 may rotate based on the rotation axis so that the angle of the side mirror 110 with respect to the front-rear direction of the vehicle 100 may be 20 to 80 degrees.

For example, the angle of the side mirror 110 with respect to the front-rear direction of the vehicle 100 in the folded state may be equal to or less than 20 degrees, and the angle of the side mirror 110 with respect to the front-rear direction of the vehicle 100 in the unfolded state may be equal to or greater than 80 degrees.

The front door 105 may have one end that is rotatably installed in the vehicle 100, and may rotate based on the rotation axis. The above description of the side mirror 110 may be similarly applied to the front door 105.

The camera 810 is disposed apart from the rotation axis such that the camera 810 does not spin in place but revolves around the rotation axis.

In some examples, as the camera 810 is disposed closer to the rotation axis on the mounting apparatus, the range of capturing may become less, and the blind zone may be reduced. As the camera 810 is disposed farther from the rotation axis on the mounting apparatus, the range of capturing may become wider, and the blind zone may be more generated.

The camera 810 may rotate at the same angular speed as the mounting apparatus and may capture an external image of the vehicle 100 at a first point and a second point.

For example, the camera 810 may rotate at the same angular speed as the mounting apparatus when the camera 810 is rotated integrally with the mounting apparatus as the mounting apparatus, in which the camera 810 is installed, is rotated.

The first point and the second point may be a different point. The camera 810 may capture the external image of the vehicle 100 at a plurality of points including the first point and the second point. The camera 810 may continuously photograph while moving from the first point to the second point.

The camera 810 may capture the external image of the vehicle 100 at the first point in which the camera is positioned when the mounting apparatus begins to rotate and at the second point in which the camera is positioned when the mounting apparatus finishes rotating.

The external image may be an external image of the vehicle 100 and an image of one or more objects (0) outside the vehicle 100. The external image may include an image related to the external appearance of the vehicle 100.

The camera 810 may be disposed on the side mirror 110 of the vehicle 100. The camera 810 may capture the external image of the vehicle 100 while the side mirror 110 rotates.

The camera 810 may be disposed adjacent to the end of the side mirror 110 remote from the rotation axis, rather than the end of the side mirror 110 close to the rotation axis of the side mirror 110.

The camera 810 may be disposed on the front door 105 of the vehicle 100. The camera 810 may capture the external image of the vehicle 100 while the front door 105 rotates.

The camera 810 may be disposed adjacent to the end portion of the front door 105 remote from the rotation axis, rather than the end portion of the front door 105 close to the rotation axis of the front door 105.

In some examples, the camera 810 may be disposed on the front door 105 of the vehicle 100, for example, on the side mirror 110 provided on the front door 105.

In the present implementation, it is illustrated that the camera 810 is a monocular camera 810, but the present disclosure is not limited thereto, and the present disclosure may also be applied to a case where the camera 810 is not a monocular camera 810 such as a stereo camera and a binocular camera.

The display 830 may display an image captured by the camera 810.

The display 830 may display an area where the distance is measured separately from an area where the distance is not measured.

The display 830 may display at least one of brightness, saturation, color, and sharpness differently so that the area where the distance is measured and the area where the distance is not measured can be distinguished from each other.

The display 830 may display the image displayed on the display 830 to be directional, in response to the direction in which the mounting apparatus is rotated.

The display 830 may display dynamic information of the object O to be superimposed on the image captured by the camera 810.

The dynamic information of the object O may include at least one of a distance between the vehicle and the object O, a speed of the object O, and an acceleration of the object O.

The display 830 may display at least one of the image captured by the camera 810 and information generated through the image processing of the image captured by the camera 810.

The controller 850 may control the camera 810 so that a first image captured at the first point and a second image captured at the second point may have an overlapping area.

The controller 850 may control a single monocular camera to photograph the overlapping area at the first point and the second point which are different from each other, thereby achieving an effect as if a stereo image is acquired by the stereo camera, in the overlapping area.

For the same object, the first image captured at the first point and the second image captured at the second point by the monocular camera may have a parallax according to the observation position.

The controller 850 may detect the object O around the vehicle 100 through the image processing of the first image and the second image.

The image processing may be an image processing for generating a three-dimensional disparity map from the first image and the second image.

The controller 850 may detect the object O by comparing the generated disparity map with stored information.

The controller 850 may measure the distance between the object O and the vehicle 100, based on the information related to the detected object O.

The controller 850 may acquire distance information and speed information between the object O and the vehicle 100 based on disparity map information generated through image processing.

The driving assistance system 800 may provide an effect of using a stereo camera even though a monocular camera is used, thereby achieving a low cost and a high efficiency.

Further, the driving assistance system 800 has an advantage that the distance to the object O may be measured even when the vehicle is stopped.

In some examples, the driving assistance system 800 may add a new operation to the controller 850 by using a camera which is provided in the vehicle for the purpose of AVM, thereby detecting the distance of the object O by software without adding a separate apparatus.

The controller 850 may generate a route for the vehicle 100 to depart from a parked state, based on the information related to the object O.

The information related to the object O may include at least one of distance information between the vehicle and the object O and relative speed information related to the vehicle with respect to the object O.

The controller 850 may receive the navigation information from the navigation system 770 and may generate a route for a vehicle to depart from a parked state, for example, based on the navigation information.

The controller 850 may receive a signal from an external device through the communication unit 400 and generate the route of vehicle, for example, based on the information provided through the communication unit 400.

The controller 850 may generate a route through which the vehicle 100 steers to a vacant space to perform parking out, when the object O exists in a space occupied by the vehicle 100 when traveling straight.

The case where the vehicle 100 travels straight may include a case where the vehicle travels straight forward and a case where the vehicle travels straight backward.

The space occupied by the vehicle 100 when traveling straight may be a space through which the straight traveling vehicle 100 passes in a three-dimensional space.

The space occupied by the vehicle 100 when traveling straight may be a space through which a cross section that has the largest area among the cross section perpendicular to the traveling direction of the vehicle 100 passes in a three-dimensional space while the vehicle 100 travels straight.

The space occupied by the vehicle 100 when traveling straight may be a space through which the exterior of the vehicle 100 passes while the vehicle 100 travels straight. The space occupied by the vehicle 100 when traveling straight may be a space required for the vehicle 100 to pass unhindered. When the object O exists in the space occupied by the vehicle 100 when traveling straight, the vehicle 100 may collide with the object O when traveling straight.

The controller 850 may generate a route in which the vehicle 100 moves backward to perform parking out, when the object O exists in a space occupied by the vehicle 100 when moving forward.

The space occupied by the vehicle 100 when moving forward may be a space through which the forward moving vehicle 100 passes in a three-dimensional space.

The space occupied by the vehicle 100 when moving forward may be a space through which a cross section that has the largest area among cross sections perpendicular to the traveling direction of the vehicle 100 passes in a three-dimensional space while the vehicle 100 moves forward.

The space occupied by the vehicle 100 when moving forward may be a space through which the exterior of the vehicle 100 passes while the vehicle 100 moves forward. The space occupied by the vehicle 100 when moving forward may be a space required for the vehicle 100 to pass unhindered. When the object O exists in the space occupied by the vehicle 100 when moving forward, the vehicle 100 may collide with the object O when moving forward.

The controller 850 may determine whether the vehicle is able to perform parking out by moving forward. When it is determined that the vehicle is not able to perform parking out by moving forward, the controller 850 may determine whether the vehicle is able to perform parking out by moving backward.

When determining whether the vehicle is able to perform parking out by moving forward, the controller 850 may determine whether the vehicle is able to perform parking out by traveling straight.

When it is determined that the vehicle is not able to perform parking out by traveling straight, the controller 850 may determine whether the vehicle is able to perform parking out while steering.

The controller 850 may set a mode for a vehicle to depart from a parked stated. The controller 850 may generate a route for a vehicle to depart from a parked state, based on the mode. The controller 850 may control the interface 870 to provide a signal to the vehicle 100 driving apparatus so that the vehicle 100 may travel along the parking out route.

For example, the parking out mode may include a parking out method and a parking out direction. The parking out method may include a right angle parking out and a parallel parking out of the vehicle 100. The parking out direction may include the left front direction, left rear direction, right front direction, and right rear direction of the vehicle 100.

The controller 850 may set the parking out mode, based on the information related to the object O.

The controller 850 may determine the parking state of the vehicle among a plurality of parking states including a left side parallel parking, a right side parallel parking, a front side parking, and a rear side parking, based on the information related to the object O.

The left side flat parking may be a flat parking which is performed by steering the vehicle to the left when the vehicle enters a parking space. The right side flat parking may be a flat parking which is performed by steering the vehicle to the right when the vehicle enters a parking space.

The front side parking may be a right angle parking which is performed by the vehicle when the front side of the vehicle faces the parking space at the time of entering a parking space. The rear side parking may be a right angle parking which is performed by the vehicle when the rear side of the vehicle faces the parking space at the time of entering a parking space.

The parking state may include a diagonal parking, and may include other parking methods in addition to the above-mentioned parking.

The controller 850 may determine the parking out method, based on the result of determining the parking state of the vehicle. The controller 850 may determine the parking out direction, based on the information related to the object O and the parking out method.

The controller 850 may primarily determine the possible parking out direction based on the parking out method, and may secondarily determine the possible parking out direction based on the information related to the object O. The controller 850 may firstly exclude the parking out direction which is not possible based on the parking out method, and then determine the possible parking out direction based on the information related to the object O, so that the parking out mode can be determined without repeating the same operation.

The controller 850 may control at least one unit provided in the vehicle 100 based on the information related to the object O located on the route. The controller 850 may control at least one unit provided in the vehicle 100, based on the distance to the object O located on the route.

The driving assistance system 800 configured as described above has an advantage of improving the user's convenience by quickly and accurately generating a route.

The controller 850 may control the interface 870 to provide a signal to the mirror driving unit 670 so that the side mirror 110 is folded when the vehicle 100 approaches the object O and is unfolded when the vehicle 100 moves away from the object O, based on the information related to the object O located on the route.

The controller 850 may generate a route as a route determined to be able to pass in a state where the side mirror 110 is folded when generating the route.

The driving assistance system 800 configured as described above may generate a route capable of providing a route for the vehicle to pass through while folding the side mirror 110, thereby generating the route. Further, the driving assistance system 800 may control the side mirror 110 to be folded when the object O approaches, thereby lowering the possibility of collision of the vehicle 100.

The controller 850 may control the interface 870 to provide a signal to the power train driving unit 610, based on the information related to the object O located on the route, so that the speed of the vehicle 100 may decrease when the vehicle 100 approaches the object O and the speed of the vehicle 100 may increase when the vehicle 100 moves away from the object O.

When the distance between the vehicle 100 and the object O is long, the risk of collision may be low even if the accuracy of the sensing information is relatively low. However, when the distance between the vehicle 100 and the object O is short, the accuracy of the sensing information needs to be high.

The controller 850 may increase the number of times of sensing until the vehicle 100 passes the object O by reducing the speed of the vehicle 100 when approaching the object O, thereby reducing the risk of collision between the vehicle 100 and the object O.

The controller 850 may generate a route for the vehicle 100 depart from a parked state ranging to the pickup position where the driver's seat door of the vehicle 100 can be opened up to a preset amount of opening.

The preset amount of opening may be an amount of opening to the extent that a driver can get in the vehicle through the driver's seat door, and may be a value pre-stored in the memory.

The preset amount of opening may be a value set according to driver characteristics. The driver's characteristics may include driver's body shape, and preference for the amount of opening.

The preset amount of opening may be a value set based on the record of the opening of the driver's seat door by the driver.

The controller 850 may control the interface 870 to provide a signal to the door driving unit 631 so that the vehicle 100 may be stopped after the vehicle 100 reaches the pickup position and the driver's seat door may be opened.

The controller 850 may generate a route for the vehicle 100 to depart from a parked state ranging to the pickup position where the driver's seat door of the vehicle 100 can be opened up to a preset amount of opening, when receiving only a parking out trigger signal without receiving a separate destination from the user.

The controller 850 may control the vehicle to autonomously perform parking out to the pickup position. The controller 850 may control the vehicle to stop when reaching the pickup position. The controller 850 may control the interface 870 to provide a signal to the door driving unit 631 so that the driver's seat door is opened when the vehicle reaches the pickup position and the vehicle stops.

The controller 850 may control the vehicle to autonomously perform parking out to the pickup position when it is possible to autonomously perform parking out to the pickup position in some section, even if it is not possible to autonomously perform parking out in the entire route of the route ranging from the parking location to the pickup position, The controller 850 may set the amount of opening of the vehicle door, based on the information related to the object O. The controller 850 may control the interface 870 to provide a signal to the door driving unit 631 of the vehicle 100 so that the door of the vehicle 100 is opened by the amount of opening.

The vehicle door may be any one of doors provided in the vehicle including the front door, rear door and trunk door of the vehicle.

The controller 850 may set the amount of opening of the vehicle door, based on the distance between the vehicle 100 and the object O.

The controller 850 may set the amount of door opening of the vehicle 100, based on the distance information between the door of the vehicle 100 and the object O.

When the amount of opening of the vehicle door is set based on the distance between the vehicle 100 and the object O, the amount of opening may be limited as the distance between the vehicle 100 and the object O is short depending on the parking state of the adjacent vehicle even though there is a space for the vehicle door to be further opened.

The controller 850 may set the amount of opening of the vehicle door, based on the distance between the vehicle door and the object O, in a three-dimensional space. The controller 850 may set the amount of opening of the vehicle door, based on real-time distance information measured by processing the image captured while the vehicle door is opened.

Such a controlling controller 850 may prevent a collision with the object O and maximize the amount of opening of the vehicle door, thereby improving the convenience of the user.

The controller 850 may measure the distance to the object O approaching the vehicle 100, based on the information related to the object O.

The controller 850 may control the interface 870 to provide a signal to the door driving unit 631 of the vehicle 100 so as to close the door, when the object O approaches within a certain distance from the door.

The controller 850 may control the door to be closed, based on the speed of the object O.

When the door is closed based on the information related to the object O, the controller 850 may control the door to be closed, based on a result of determining whether the passenger is getting off.

Such a controlling controller 850 may prevent a collision with the object O in a dangerous situation while securing the safety of the passenger.

The controller 850 may control the display 830 so that the image captured by the camera 810 may be displayed.

The controller 850 may control the display 830 so that the area where the distance is measured may be displayed differently from the area where the distance is not measured.

The controller 850 may control the display 830 so that the image captured by the camera 810 is displayed and the area where the distance is measured may be displayed differently from the area where the distance is not measured as the distance between the object O and the vehicle 100 is measured by the controller 850.

The controller 850 may display the image relating to the object O before the distance from the vehicle is measured on the display. The controller 850 may control the area where the distance is measured in the image displayed on the display to be displayed differently from the area where the distance is not measured.

The controller 850 may control the area where the distance is measured to be displayed differently from the area where the distance is not measured, through the image processing.

The controller 850 may control the display 830 so that the image displayed on the display may be gradually changed as the area where the distance is measured is gradually expanded.

The controller 850 may control the display 830 so that the image displayed on the display 830 may be displayed to be directional, in response to the direction in which the mounting apparatus is rotated.

The controller 850 may control the image displayed on the display 830 to be gradually displayed in the direction in which the side mirror 110 is rotated.

The case where the front door 105 is rotated and the captured image is displayed on the display 830 may be understood similarly to the case of the side mirror.

Thus, the controller 850 may control the display 830 in a user-friendly manner.

The controller 850 may control the display 830 so that the dynamic information of the object O may be superimposed on the image captured by the camera 810.

The controller 850 may control the display 830 to display the dynamic information of the object O, based on the information related to the object O. The dynamic information of the object O may include at least one of the distance between the vehicle and the object O, the speed of the object O, and the acceleration of the object O.

The controller 850 may control the display 830 so that at least one of the image captured by the camera 810 and the information generated by the image processing of the image captured by the camera 810 may be displayed on the display 830.

The controller 850 may detect the object O around the vehicle 100 and measure the distance between the object O and the vehicle 100 through image processing of the image captured by the camera 810. The information generated through the image processing of the image captured by the camera 810 may be dynamic information of the object O.

The dynamic information of the object O may include at least one of the distance between the vehicle and the object O, the speed of the object O, the relative speed of the object O to the vehicle 100, the acceleration of the object O, and the relative acceleration of the object O to the vehicle 100.

The interface 870 may serve as a passage to various types of external devices connected to the driving assistance system 800.

The interface 870 may serve as a passage for supplying electrical energy to the connected mobile terminal. When the mobile terminal is electrically connected to the interface 870, the interface 870 may provide the mobile terminal with electric energy supplied from the power supply unit 890 under the control of the controller 850.

The interface 870 may be the interface 130. The interface 870 may be provided in the driving assistance system 800 separately from the interface 130.

The power supply unit 890 may supply power necessary for the operation of each component under the control of the controller 850. For example, the power supply unit 890 may receive power from a battery or the like inside the vehicle.

The power supply unit 890 may be the power supply unit 190. The power supply unit 890 may be provided in the driving assistance system 800 separately from the power supply unit 190.

Figure 9:
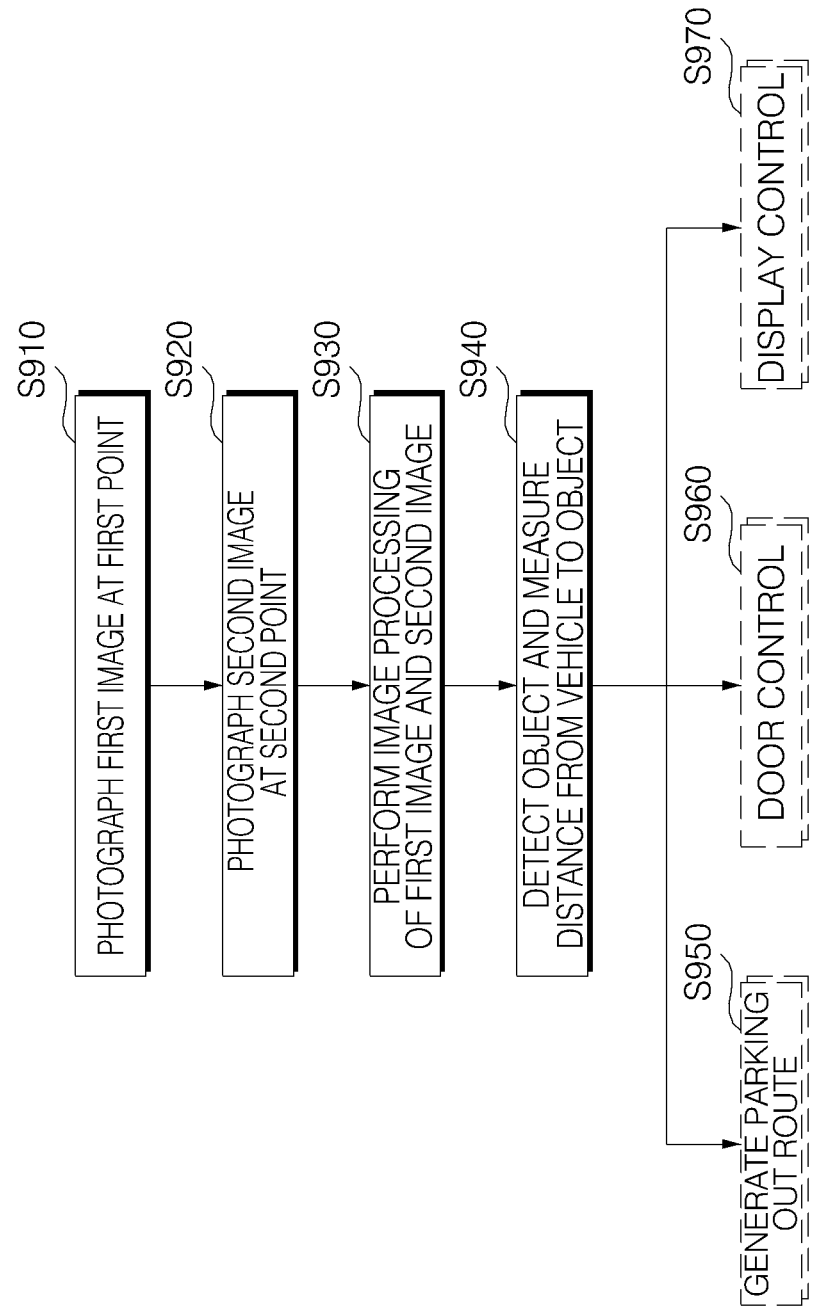
FIG. 9 is a control flowchart of an example process of an example driving assistance system.

FIG. 9 is a control flowchart illustrating an example driving assistance system.

First, the camera 810 may rotate at the same angular speed as the mounting apparatus, and may capture an external image of the vehicle 100 at a first point and a second point (S910 and S920).

The camera 810 may capture the external image of the vehicle 100 at the first point, which is one point on a trajectory drawn by the camera 810 while the camera 810b rotates, and a second point which is another point.

The camera 810 may capture the external image of the vehicle 100 at the first point where the camera is located when the mounting apparatus starts to rotate and at the second point where the camera is located when the mounting apparatus finishes rotating.

The camera 810 may capture the external image of the vehicle 100 at a plurality of points including the first point and the second point.

The camera 810 may successively photograph the external image of the vehicle 100 while the camera 810 rotates from the first point to the second point.

At this time, the controller 850 may control the camera 810 so that a first image captured at the first point and a second image captured at the second point may have an overlapping area.

Next, the controller 850 may perform an image processing of the first image and the second image (S930).

The image processing may be an image processing for generating a three-dimensional disparity map from the first image and the second image. The image processing for generating the disparity map will be described in more detail below.

Next, the controller 850 may detect the object O around the vehicle 100 through the image processing of the first image and the second image (S940).

The controller 850 may detect the object O by comparing the generated disparity map with stored information.

In some examples, the controller 850 may measure the distance between the object O and the vehicle 100, based on the information related to the detected object O (S940).

The controller 850 may acquire distance information and speed information between the object O and the vehicle 100, based on disparity map information generated through the image processing.

In some implementations, the controller 850 may generate the route for the vehicle 100 to depart from a parked state, based on the information related to the object O (S950).

The information related to the object O may include at least one of the distance information between the vehicle and the object O and the relative speed information of the object O with respect to the vehicle. The generation of route will be described in detail below.

In some implementations, the controller 850 may set the amount of opening of the vehicle door, based on the information related to the object O.

The controller 850 may control the interface 870 to provide a signal to the door driving unit 631 of the vehicle 100 so that the door of the vehicle 100 may be opened by the amount of opening (S960). The door control will be described in detail below.

In some examples, the controller 850 may control the display 830 to display the image captured by the camera 810 (S970). The display control will be described in detail below.

Figure 10:
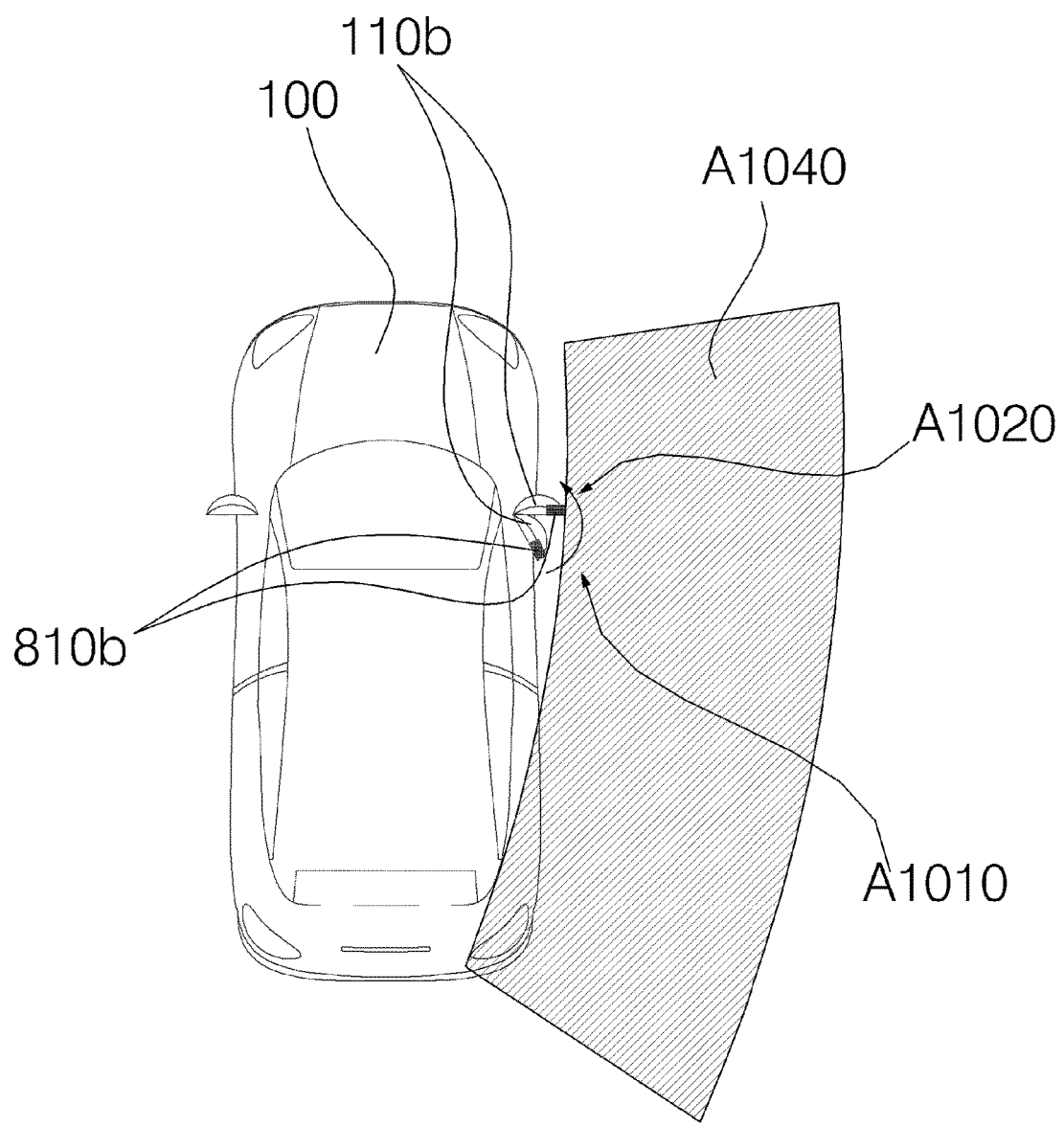
FIG. 10 is a diagram illustrating example rotation of an example camera.

FIG. 10 is a diagram illustrating example rotation of an example camera 810*b*.

Referring to FIG. 10, the camera 810*b* may rotate at the same angular speed as the side mirror 110*b*, and may capture an external image of the vehicle 100 at a first point A1010 and a second point A1020.

The camera 810*b* may capture the external image of the vehicle 100 at the first point A1010 where the camera 810*b* is located when the side mirror 110*b* starts to rotate and at the second position A1020 where the camera 810*b* is located when the side mirror 110*b* finishes rotating.

For example, the first point A1010 may be a point on a trajectory drawn by the camera 810*b* disposed on the side mirror 110*b* while the camera 810*b* rotates. The first point A1010 may be a point where the camera 810*b* is located in a state where the side mirror 110*b* is folded.

The second point A1020 may be a point on a trajectory drawn by the camera 810*b* disposed on the side mirror 110*b* while the camera 810*b* rotates. The second point A1020 may be a point where the camera 810*b* is located in a state where the side mirror 110*b* is unfolded.

Referring to FIG. 10, for example, the side mirror 110*b* may be unfolded, and the camera 810*b* may capture the external image of the vehicle 100 at the first point A1010 and the second point A1020.

A range A1040 of photographing by the camera 810*b* may be widened in proportion to the radius of rotation of the camera 810*b*. The range A1040 of photographing by the camera 810*b* may cover an area from one side of the vehicle 100 to a certain distance. The range A1040 of photographing by the camera 810*b* may cover a part of the rear of the vehicle 100.

For example, the camera 810*b* may capture the external image of the vehicle 100 at the first point A1010 and the second point A1020, while the side mirror 110*b* is folded.

The controller 850 may control the camera 810*b* so that the first image captured at the first point A1010 and the second image captured at the second point A1020 may have an overlapping area.

Figure 11:
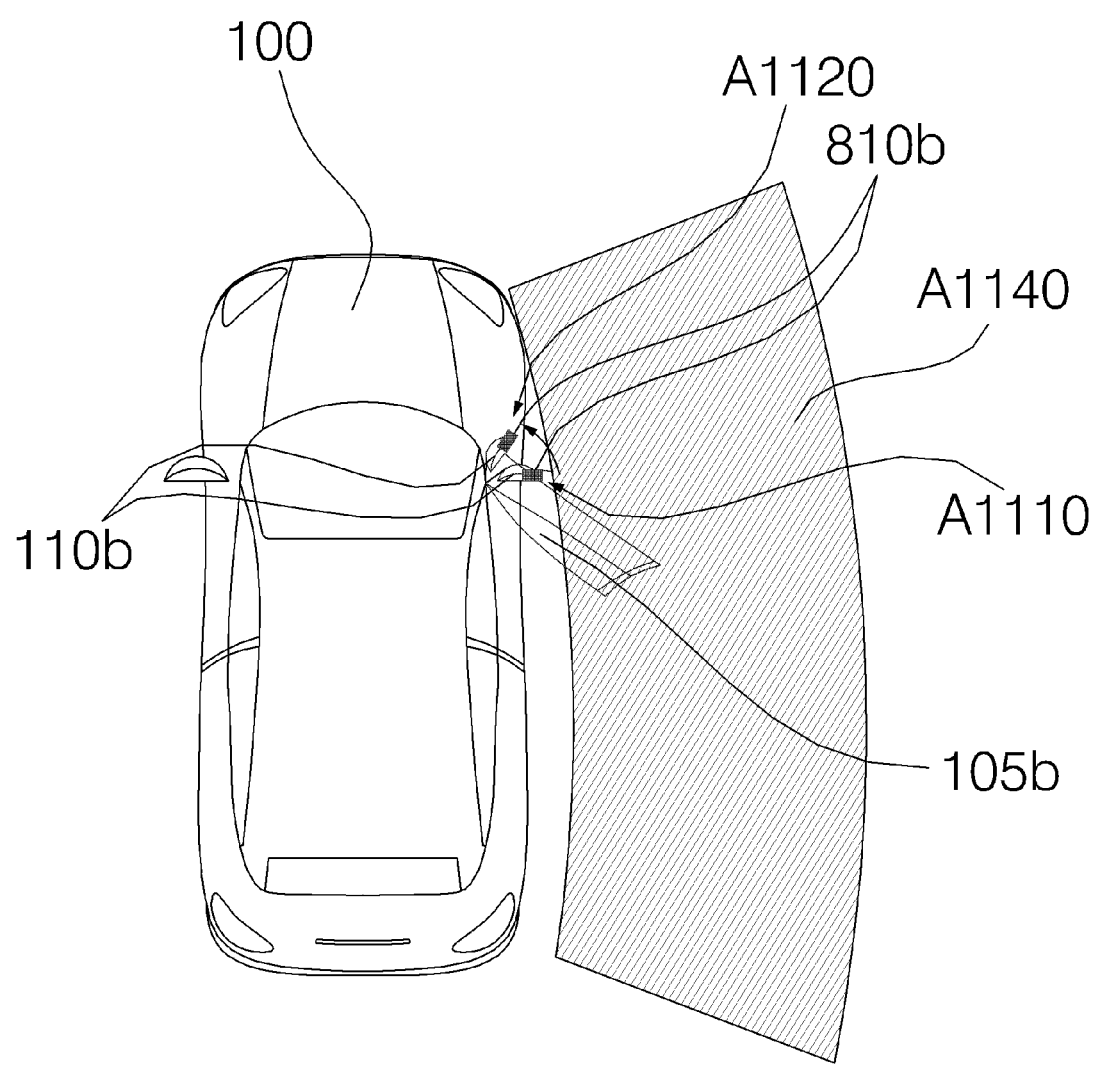
FIG. 11 is a diagram illustrating another example rotation of an example camera.

FIG. 11 is a diagram illustrating example rotation of an example camera 810*b*.

Referring to FIG. 11, the camera 810*b* may rotate at the same angular speed as the side mirror 110*b*, and may capture an external image of the vehicle 100 at a first point A 1110 and a second point A 1120.

The camera 810*b* may capture the external image of the vehicle 100 at the first point A1110 where the camera 810*b* is located when the side mirror 110*b* starts to rotate and at the second position A1120 where the camera 810*b* is located when the side mirror 110*b* finishes rotating.

Here, the first point A1110 may be a point on a trajectory drawn by the camera 810*b* disposed on the side mirror 110*b* while the camera 810*b* rotates. The first point A1110 may be a point where the camera 810*b* is located in a state where the front door 105*b* is opened and the side mirror 110*b* is folded.

For example, the second point A1120 may be a point on a trajectory drawn by the camera 810*b* disposed on the side mirror 110*b* while the camera 810*b* rotates. The second point A1120 may be a point where the camera 810*b* is located in a state where the front door 105*b* is opened and the side mirror 110*b* is unfolded.

Referring to FIG. 11, for example, in a state where the front door 105*b* is opened, the side mirror 110*b* may be unfolded, and the camera 810*b* may capture the external image of the vehicle 100 at the first point A1110 and the second point A1120.

At this time, a range A1140 of photographing by the camera 810*b* may be widened in proportion to the radius of rotation of the camera 810*b*. The range A1140 of photographing by the camera 810*b* may cover an area from one side of the vehicle 100 to a certain distance. The range A1140 of photographing by the camera 810*b* may cover a part of the rear of the vehicle 100. The range A1140 of photographing by the camera 810*b* may cover a part of the front of the vehicle 100.

The range A1140 of photographing by the camera 810*b* while the side mirror 110*b* rotates in a state where the front door 105*b* is opened may cover the front area of the vehicle more than the range A1040 of photographing by the camera 810*b* while the side mirror 110*b* rotates in a state where the front door 105*b* is closed.

For another example, in a state where the front door 105*b* is opened, the side mirror 110*b* may be folded, and the camera 810*b* may capture the external image of the vehicle 100 at the first point A1110 and the second point A1120.

At this time, the controller 850 may control the camera 810*b* so that the first image captured at the first point A1110 and the second image captured at the second point A1120 may have an overlapping area.

Figure 12:
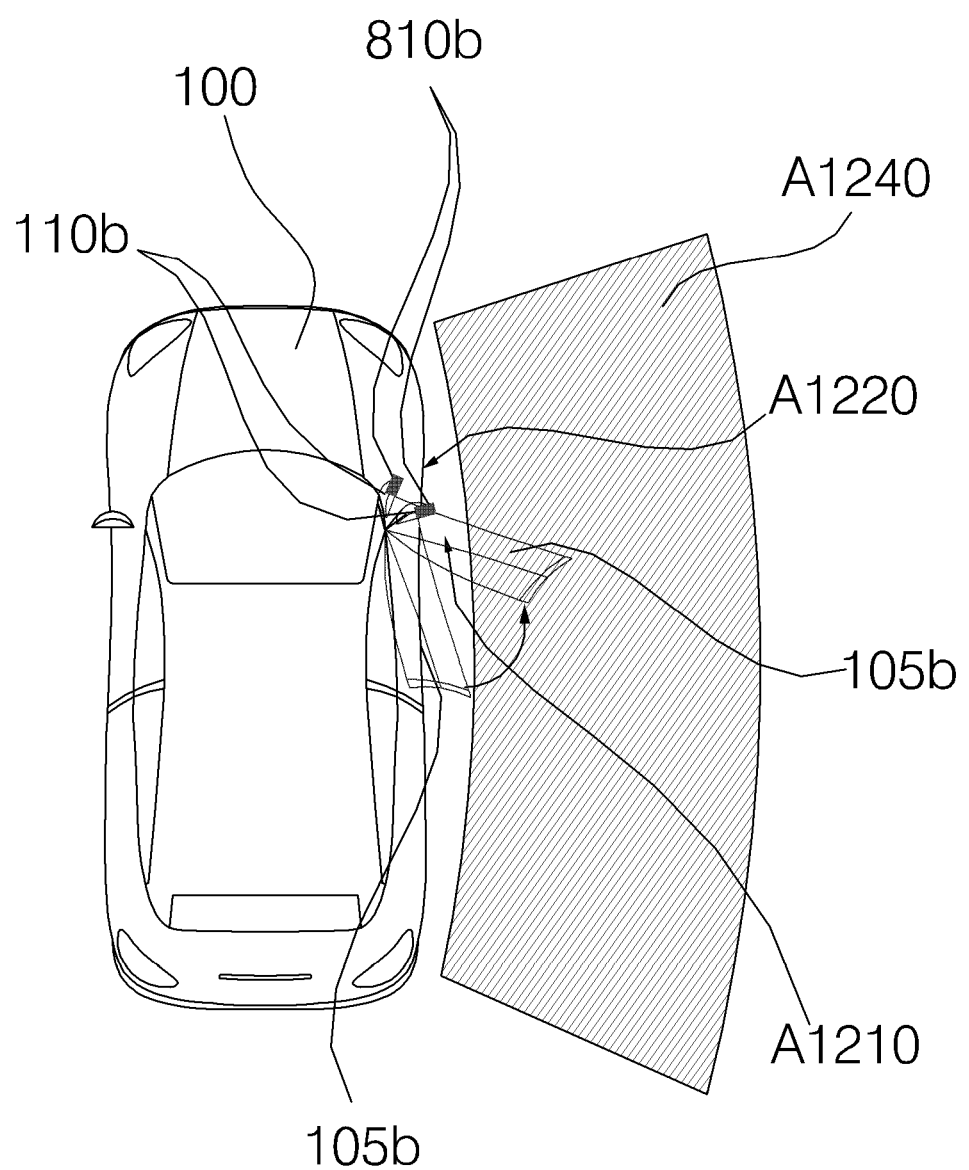
FIG. 12 is a diagram for illustrating another example rotation of an example camera.

FIG. 12 is a diagram illustrating example rotation of an example camera 810*b*.

Referring to FIG. 12, the camera 810*b* may rotate at the same angular speed as the front door 105*b*, and may capture an external image of the vehicle 100 at a first point A1210 and a second point A1220.

The camera 810*b* may capture the external image of the vehicle 100 at the first point A1210 where the camera 810*b* is located when the front door 105*b* starts to rotate and at the second position A1220 where the camera 810*b* is located when the front door 105*b* finishes rotating.

For example, the first point A1210 may be a point on a trajectory drawn by the camera 810*b* while unfolding the front door 105*b*. The first point A1210 may be a point where the camera 810*b* is located in a state where the front door 105*b* is folded.

The second point A1220 may be a point on a trajectory drawn by the camera 810*b* while unfolding the front door 105*b*. The second point A1220 may be a point where the camera 810*b* is located in a state where the front door 105*b* is opened.

Referring to FIG. 12, for example, the front door 105*b* may be unfolded, and the camera 810*b* may capture the external image of the vehicle 100 at the first point A1210 and the second point A1220.

At this time, a range A1240 of photographing by the camera 810b may be widened in proportion to the radius of rotation of the camera 810b. The range A1240 of photographing by the camera 810b may cover an area from one side of the vehicle 100 to a certain distance. The range A1240 of photographing by the camera 810b may cover a part of the rear of the vehicle 100. The range A1240 of photographing by the camera 810b may cover a part of the front of the vehicle 100.

The range A1240 of photographing by the camera 810b while the front door 105b rotates may cover the front area of the vehicle more than the range A1040 of photographing by the camera 810b while the side mirror 110b rotates.

For another example, the camera 810b may capture the external image of the vehicle 100 at the first point A1210 and the second point A1220, while the front door 105b is folded.

At this time, the controller 850 may control the camera 810b so that the first image captured at the first point A1210 and the second image captured at the second point A1220 may have an overlapping area.

In some implementations, when the camera 810b captures an image while the front door 105b and the side mirror 110b rotate simultaneously, a wider range of image can be captured than a case where the camera 810b captures an image while the front door 105 or the side mirror 110b rotates.

Figure 13:
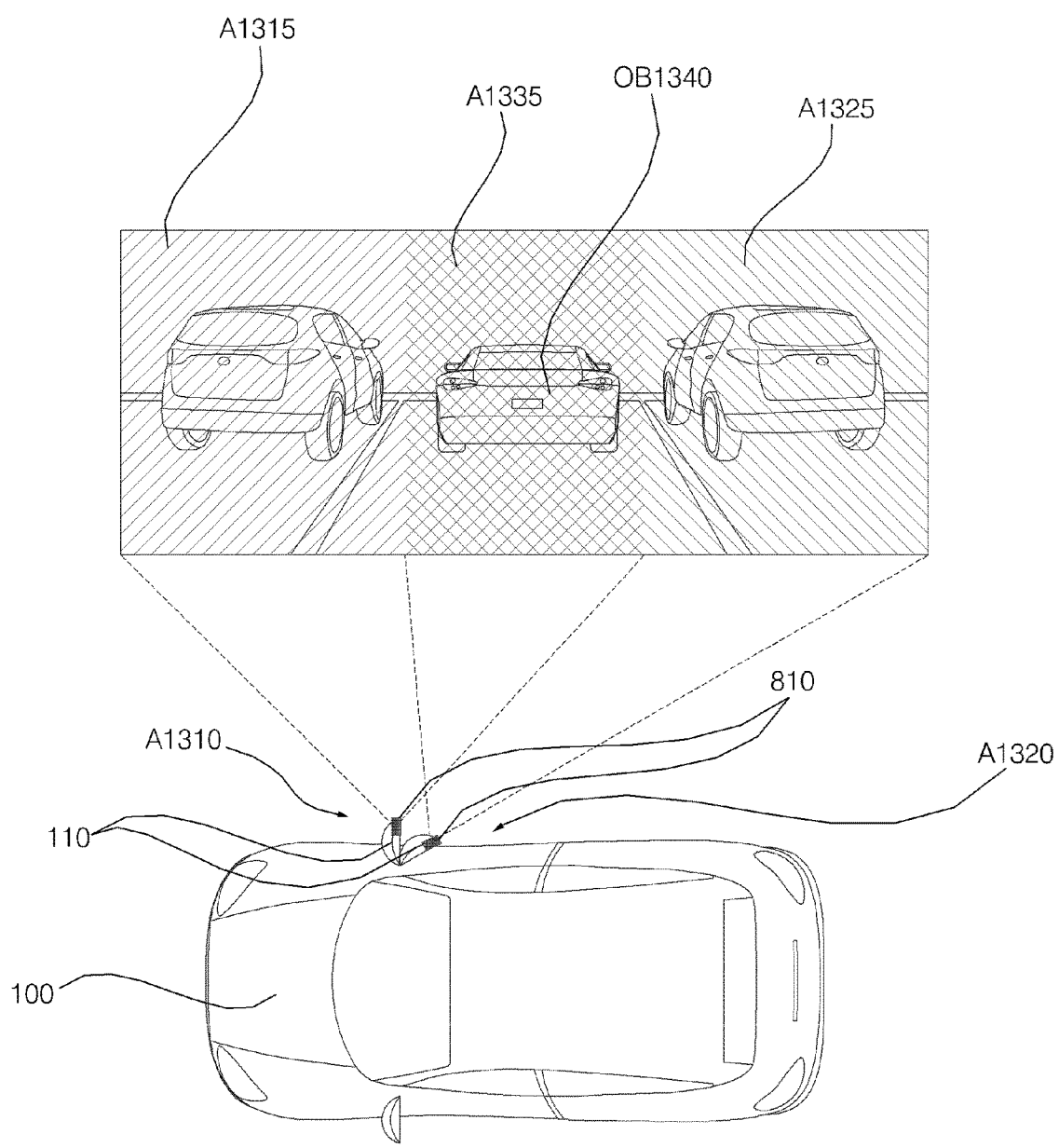
FIG. 13 is a diagram illustrating an example image processing of a driving assistance system.

FIG. 13 is a diagram illustrating an example image processing of an example driving assistance system.

Referring to FIG. 13, the camera 810 may rotate at the same angular speed as the side mirror 110, and may capture the external image of the vehicle 100 at a first point A1310 and a second point A1320.

For example, the first point may be a point where the camera 810 is located in a state where the side mirror 110 is unfolded.

The second point may be a point where the camera 810 is located in a state where the side mirror 110 is folded.

The controller 850 may control the camera 810 so that the first image A1315 captured at the first point A1310 and the second image A1325 captured at the second point A1320 may have an overlapping area A1335.

At this time, the first image A1315 and the second image A1325 may have a parallax according to the observation position with respect to the object OB1310 located in the overlapping area A1335.

The controller 850 may perform image processing for generating a disparity map from the first image A1315 and the second image A1325.

The disparity map may be an image processing method for acquiring three-dimensional information from two-dimensional image information.

The controller 850 may detect the object OB1310 by comparing the generated disparity map with the stored information.

The controller 850 may measure the distance between the object OB1340 and the vehicle 100, based on the information related to the detected object OB1340.

The controller 850 may acquire distance information and speed information between the object OB 1340 and the vehicle 100, based on the disparity map information generated through the image processing.

Figure 14A:
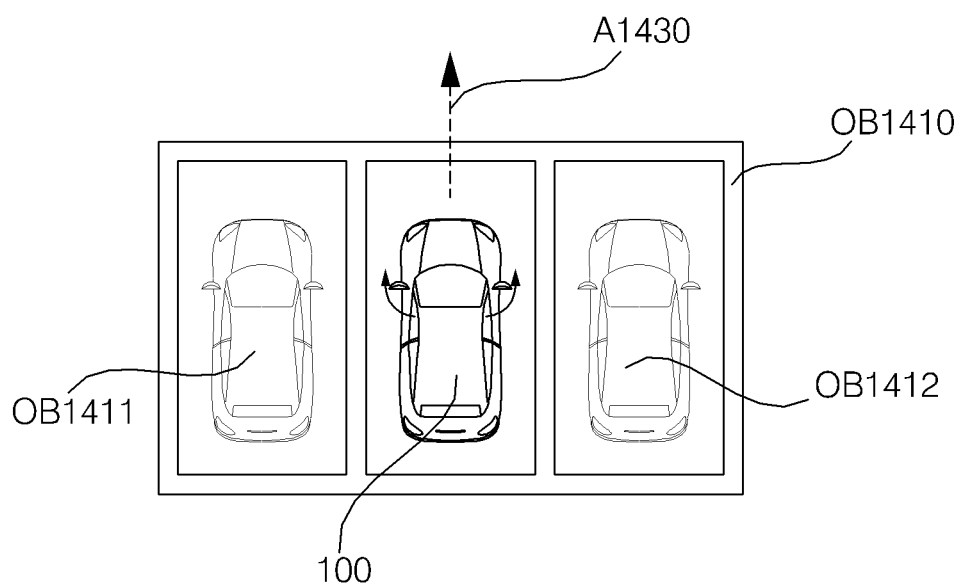
FIG. 14A and FIG. 14B are diagrams illustrating example routes.
Figure 14B:
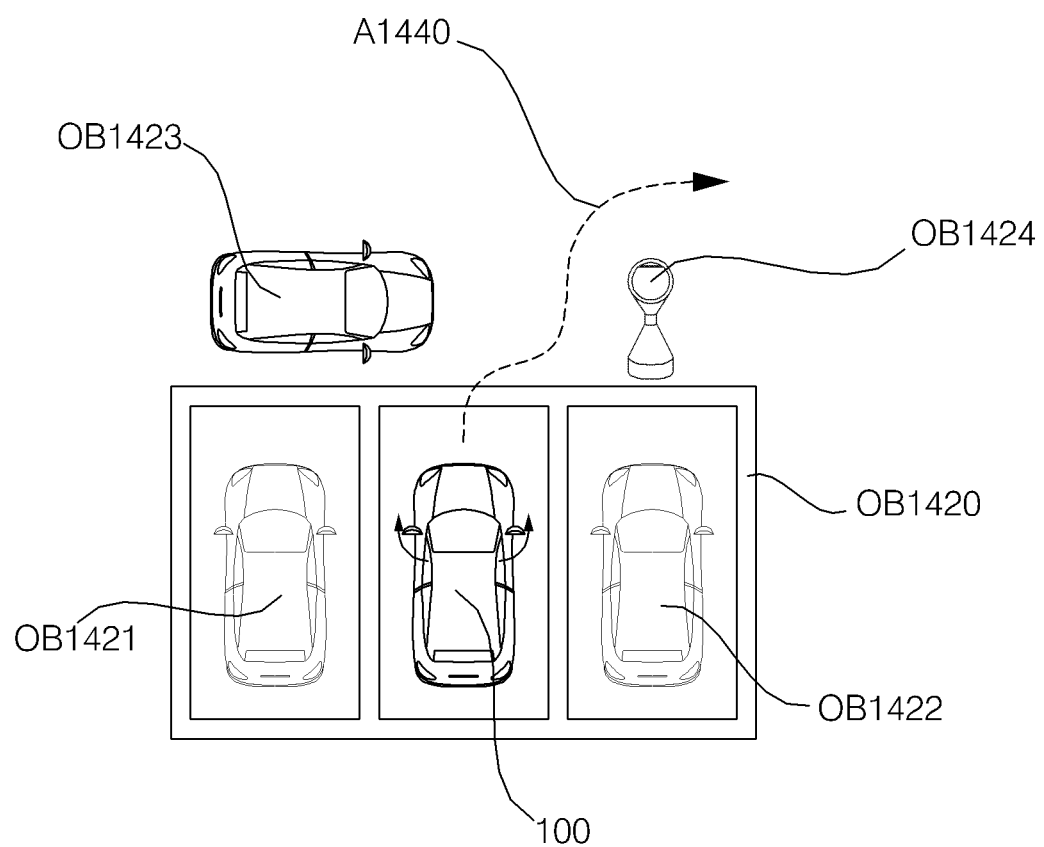

FIG. 14A and FIG. 14B are diagrams illustrating generation of an example route.

The camera 810 may rotate at the same angular speed as the side mirror 110 and may capture the external image of the vehicle 100 at a first point and a second point.

For example, the first point may be a point where the camera 810 is located in a state where the side mirror 110 is folded.

The second point may be a point where the camera 810 is located in a state where the side mirror 110 is unfolded.

The controller 850 may control the camera 810 so that a first image captured at the first point and a second image captured at the second point may have an overlapping area.

Referring to FIG. 14A, the controller 850 may detect an object (OB1410, OB1411, and OB1412) around the vehicle, through the image processing of the first image and the second image captured in a stopped state.

The controller 850 may measure the distance between each of the objects OB1410, OB1411 and OB1412 and the vehicle 100, based on the information related to the detected object OB1410, OB1411 and OB1412.

The controller 850 may determine whether the object O exists in the space occupied by the vehicle 100 when traveling straight.

For example, the controller 850 may determine whether the object O exists in the space occupied by the vehicle 100 when traveling straight, based on the cross section having the largest area among the cross section perpendicular to the traveling direction of the vehicle 100.

The controller 850 may determine whether the object O exists in the space occupied by the vehicle 100 when traveling straight by moving forward. When the object O exists in the space, the controller 850 may determine whether the object O exists in the space occupied by the vehicle 100 when traveling straight by moving backward.

The controller 850 may generate a route through which the vehicle 100 steers to an empty space and performs parking out, when the object O exists in the space occupied by the vehicle 100 when traveling straight.

The controller 850 may generate a route A1430 through which the vehicle 100 travels straight by moving forward to perform parking out, when it is determined that the object O does not exist in the space occupied by the vehicle 100 at the time of moving straight forward.

Referring to FIG. 14B, the controller 850 may detect the object (OB1420, OB1421, OB1422, OB1423, OB1424) around the vehicle, through the image processing of the image captured in the stopped state.

The controller 850 may measure the distance between the vehicle 100 and each of the objects OB1420, OB1421, OB1422, OB1423 and OB1424, based on the information related to the detected object OB1420, OB1421, OB1422, OB1423 and OB1424.

The controller 850 may determine whether the object O exists in the space occupied by the vehicle 100 when traveling straight.

The controller 850 may determine whether the object O exists in the space occupied by the vehicle 100 when traveling straight by moving forward. When the object O exists in the space, the controller 850 may determine whether the object O exists in the space occupied by the vehicle 100 when traveling straight by moving backward.

When it is determined that the vehicle is not able to perform parking out by traveling straight forward or traveling straight backward, the controller 850 may generate a route through which the vehicle 100 steers to an empty space and performs parking out.

The controller 850 may determine whether it is possible to generate a route to an empty space between the objects OB1423 and OB1424, when the object OB1423 and OB1424 exist in the route through which the vehicle performs parking out by moving forward.

The controller 850 may determine whether the object OB1423 and OB1424 exists in the space occupied by the vehicle 100 when moving forward, based on the information related to the object OB1423 and OB1424.

For example, the controller 850 may determine whether the object OB1423 and OB1424 exists in the space occupied by the vehicle 100 when moving forward, based on the cross section having the largest area among the cross section perpendicular to the traveling direction of the vehicle 100.

When it is determined that the object OB1423 and OB1424 does not exist in the space occupied by the vehicle 100 when moving forward and a route to an empty space between the objects OB1423 and OB1424 can be generated, the controller 850 may generate a route A1440 through which the vehicle 100 steers to perform parking out.

Referring to FIG. 14B, when there is a moving object OB1423, the controller 850 may determine whether it is possible to generate a route to an empty space between the objects OB1423 and OB1424, based on distance and speed information with respect to the moving object OB1423.

The controller 850 may determine whether the moving object OB1423 enters into the space occupied when moving forward and the entering time, based on the distance and the speed information with respect to the moving object OB1423.

The controller 850 may determine whether it is possible to generate a route to an empty space between the objects OB1423 and OB1424, based on information on whether the moving object OB1423 enters into the space occupied when moving forward and the entering time.

The controller 850 may generate a route A1440 through which the vehicle 100 steers to perform parking out, when it is determined that it is possible to generate a route to an empty space between the objects OB1423 and OB1424.

Figure 15A:
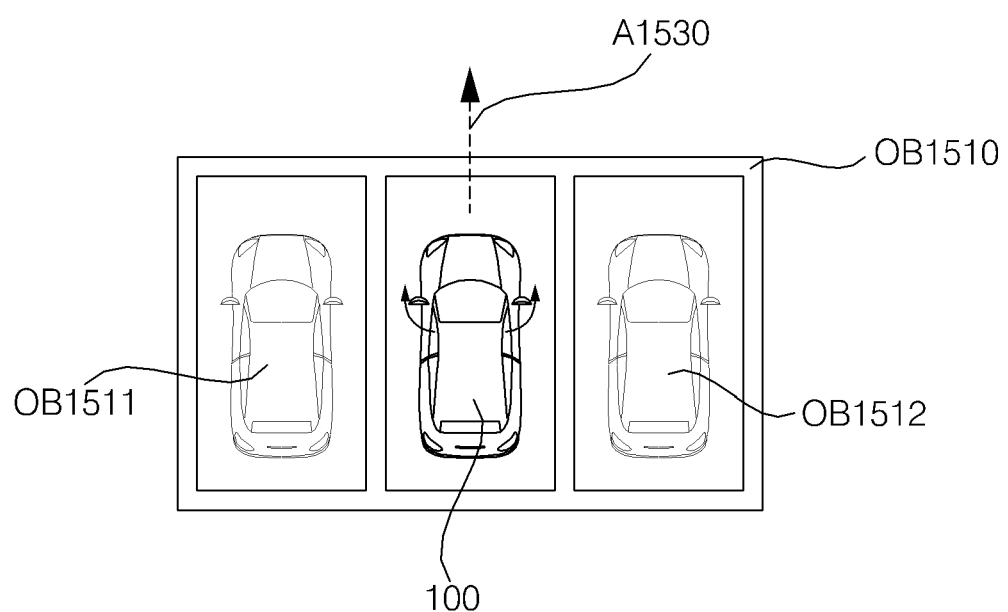
FIG. 15A and FIG. 15B are diagrams illustrating example routes.
Figure 15B:
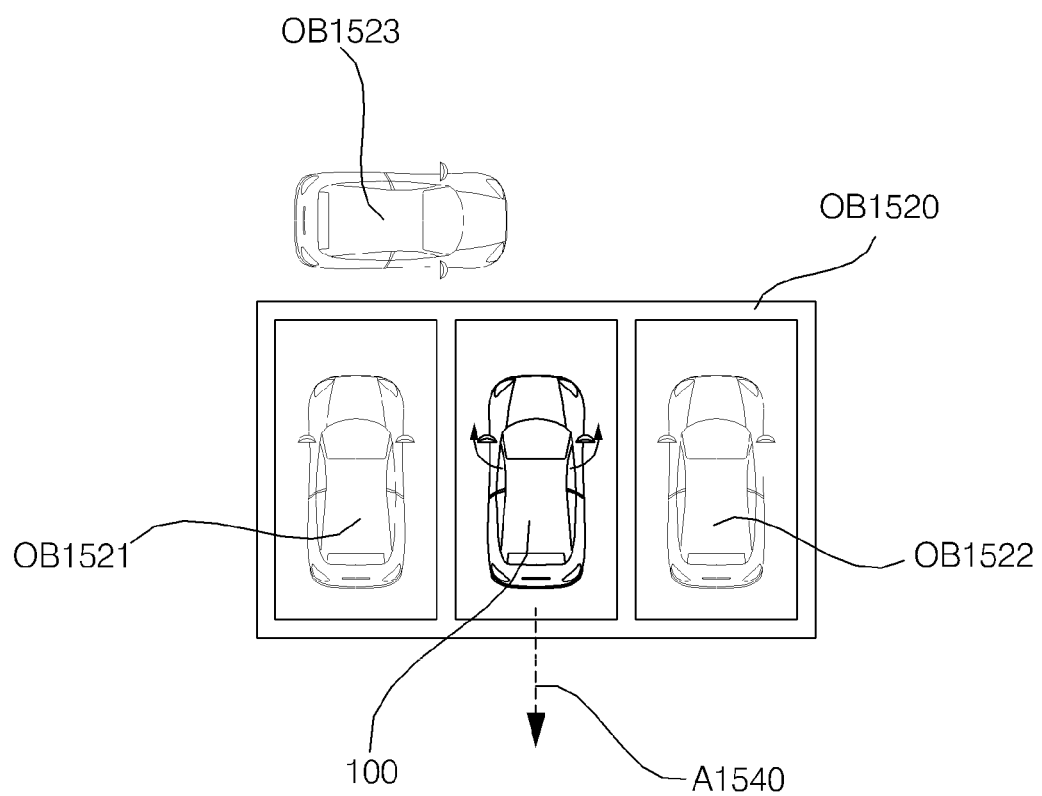

FIG. 15A and FIG. 15B are diagrams illustrating generation of an example route.

The camera 810 may rotate at the same angular speed as the side mirror 110 and may capture the external image of the vehicle 100 at a first point and a second point.

For example, the first point may be a point where the camera 810 is located in a state where the side mirror 110 is folded.

The second point may be a point where the camera 810 is located in a state where the side mirror 110 is unfolded.

The controller 850 may control the camera 810 so that a first image captured at the first point and a second image captured at the second point may have an overlapping area.

Referring to FIG. 15A, the controller 850 may detect an object (OB1510, OB1511, and OB1512) around the vehicle, through the image processing of the first image and the second image captured in a stopped state.

The controller 850 may measure the distance between each of the objects OB1510, OB1511, and OB1512 and the vehicle 100, based on the information related to the detected object OB1510, OB1511, and OB1512.

The controller 850 may determine whether the object O exists in the space occupied by the vehicle 100 when moving forward.

For example, the controller 850 may determine whether the object O exists in the space occupied by the vehicle 100 when moving forward, based on the cross section having the largest area among the cross section perpendicular to the traveling direction of the vehicle 100.

The controller 850 may determine whether the object O exists in the space occupied by the vehicle 100 when moving forward. When the object O exists in the space, the controller 850 may determine whether the object O exists in the space occupied by the vehicle 100 when moving backward.

The controller 850 may generate a route A1530 through which the vehicle 100 moves forward to perform parking out, when it is determined that the object O does not exist in the space occupied by the vehicle 100 at the time of moving forward.

Referring to FIG. 15B, the controller 850 may detect the object (OB1520, OB1521, OB1522, and OB1523) around the vehicle, through the image processing of the image captured in a stopped state.

The controller 850 may measure the distance between the vehicle 100 and each of the objects OB1520, OB1521, OB1522, and OB1523, based on the information related to the detected object OB1520, OB1521, OB1522, and OB1523.

The controller 850 may determine whether the object O exists in the space occupied by the vehicle 100 when moving forward.

The controller 850 may generate a route A1540 through which the vehicle 100 moves backward to perform parking out, when it is determined that the object O exists in the space occupied by the vehicle 100 when moving forward.

Referring to FIG. 15B, when there is a moving object OB1523, the controller 850 may determine whether it is possible to generate a route to an empty space between the objects OB1522 and OB1523, based on distance and speed information with respect to the moving object OB1523.

The controller 850 may determine whether the moving object OB1523 enters into the space occupied when moving forward and the entering time, based on the distance and the speed information with respect to the moving object OB1523.

The controller 850 may determine whether it is possible to generate a route to an empty space between the objects OB1522 and OB1523, based on information on whether the moving object OB1523 enters into the space occupied when moving forward and the entering time.

The controller 850 may generate a route A1540 through which the vehicle 100 moves backward to perform parking out, when it is determined that it is not possible to generate a route to an empty space between the objects OB1525 and OB1523.

Figure 16A:
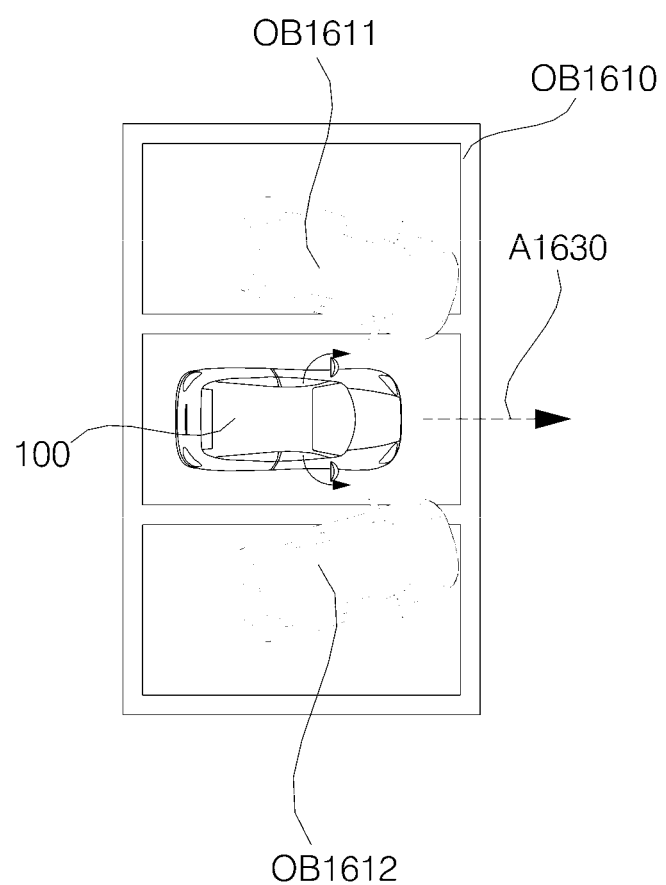
FIGS. 16A, 16B and 16C are diagrams illustrating an example control of a side mirror.
Figure 16B:
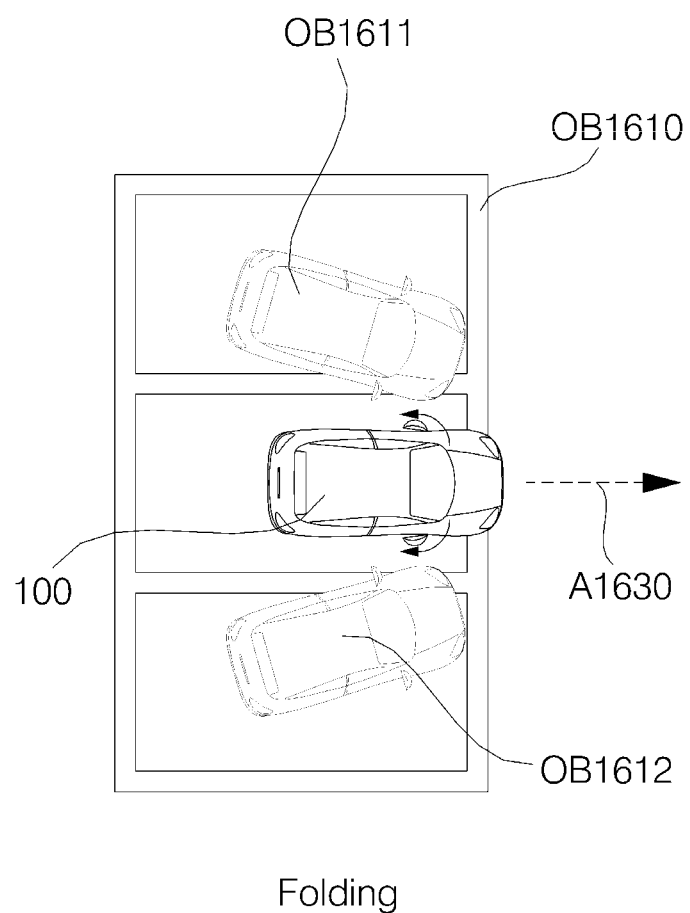
Figure 16C:
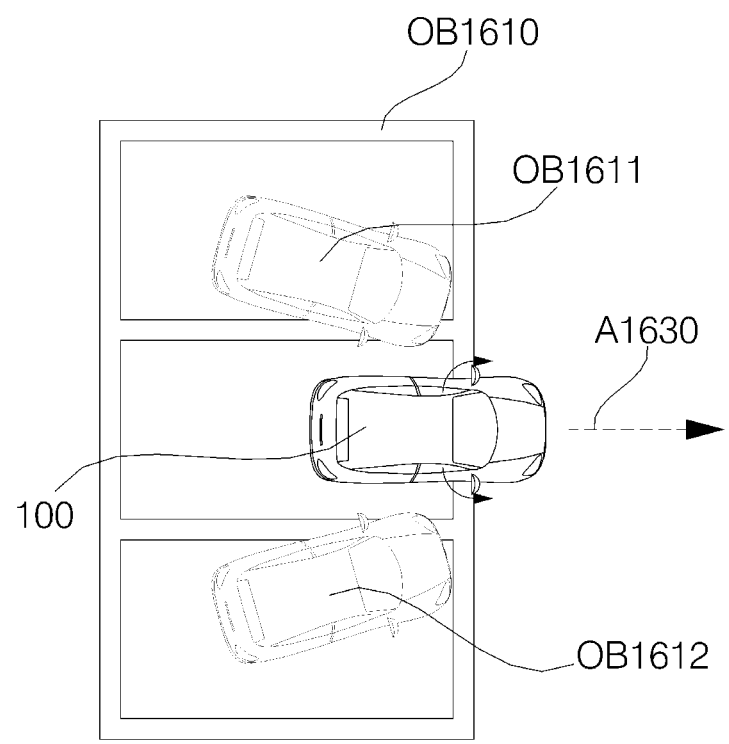

FIGS. 16A, 16B and 16C are diagrams illustrating an example control of an example side mirror.

The camera 810 may rotate at the same angular speed as the side mirror 110 and may capture the external image of the vehicle 100 at a first point and a second point.

For example, the first point may be a point where the camera 810 is located in a state where the side mirror 110 is folded.

The second point may be a point where the camera 810 is located in a state where the side mirror 110 is unfolded.

The controller 850 may control the camera 810 so that a first image captured at the first point and a second image captured at the second point may have an overlapping area.

Referring to FIG. 16A, the controller 850 may detect an object (OB1610, OB1611, and OB1612) around the vehicle, through the image processing of the first image and the second image captured in a stopped state.

The controller 850 may measure the distance between each of the objects OB1610, OB1611, and OB1612 and the vehicle 100, based on the information related to the detected object OB1610, OB1611, and OB1612.

The controller 850 may generate a route for the vehicle 100 to depart from a parked state, based on the information related to the object OB1610, OB1611, and OB1612.

The controller 850 may generate a route between other vehicles OB1611 and OB1612, when the other vehicles OB1611 and OB1612 intrude into and are parked on a parking line OB1610 in which the vehicle 100 is parked.

The controller 850 may generate a route as a route determined to be able to pass in a state where the side mirror 110 is folded, when generating the route.

The controller 850 may control the interface 870 to provide a signal to the power train driving unit 610 so that the vehicle 100 may travel at a constant speed A1630 along the generated route.

Referring to FIG. 16B, in case the distance between the vehicle 100 and the other vehicles OB1611 and OB1612 is less than a set value when the vehicle 100 travels along the generated route, the controller 850 may control the interface 870 to provide a signal to the mirror driving unit 670 so that the side mirror 110 of the vehicle 100 may be folded when the distance to the other vehicles OB1611 and OB1612 is less than the set value.

Referring to FIG. 16C, when the vehicle 100 continues to travel along the generated route and the distance between the vehicle 100 and the other vehicles OB1611 and OB1612 is equal to or greater than a set value, the controller 850 may control the interface 870 to provide a signal to the mirror driving unit 670 so that the side mirror 110 of the vehicle 100 may be unfolded.

In some implementations, although not shown, when there is other vehicle OB1611 approaching the generated route, the controller 850 may control the interface 870 to provide a signal to the mirror driving unit 670 so that the side mirror 110 of the vehicle 100 may be folded when the distance to the other vehicle OB1611 is less than the set value.

When the other vehicle OB1611 continues to travel and the distance between the vehicle 100 and the other vehicle OB1611 is equal to or greater than a set value, the controller 850 may control the interface 870 to provide a signal to the mirror driving unit 670 so that the side mirror 110 of the vehicle 100 may be unfolded.

Figure 17A:
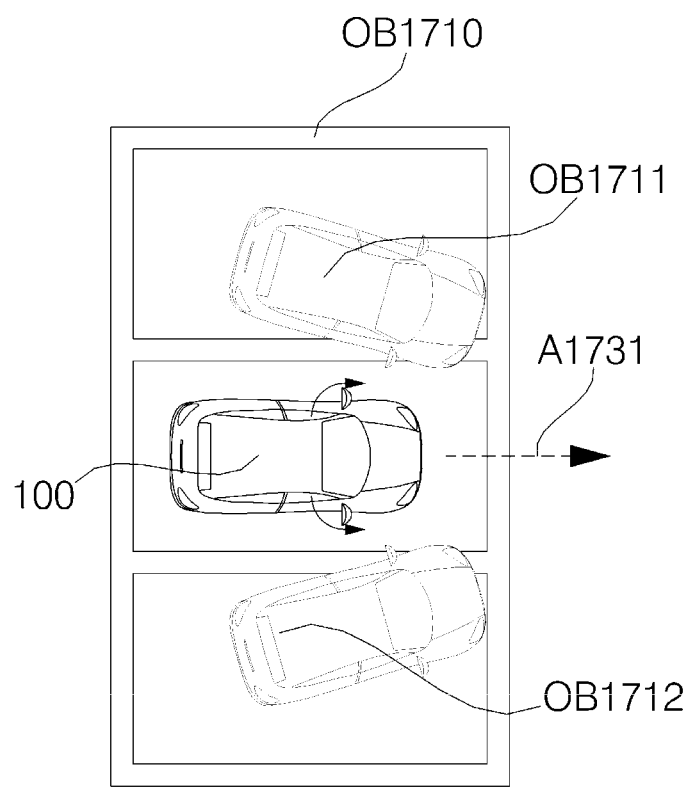
FIGS. 17A, 17B and 17C are diagrams illustrating an example speed control of a vehicle.
Figure 17B:
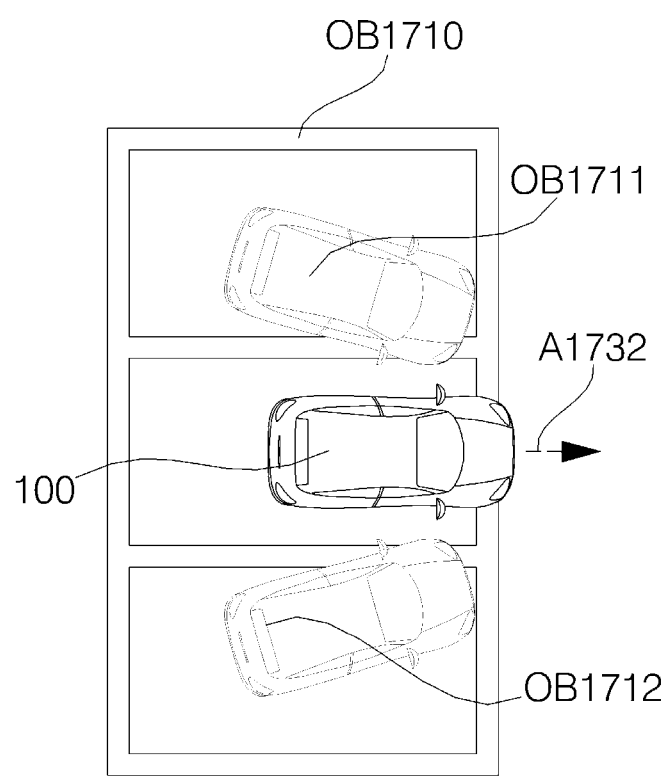
Figure 17C:
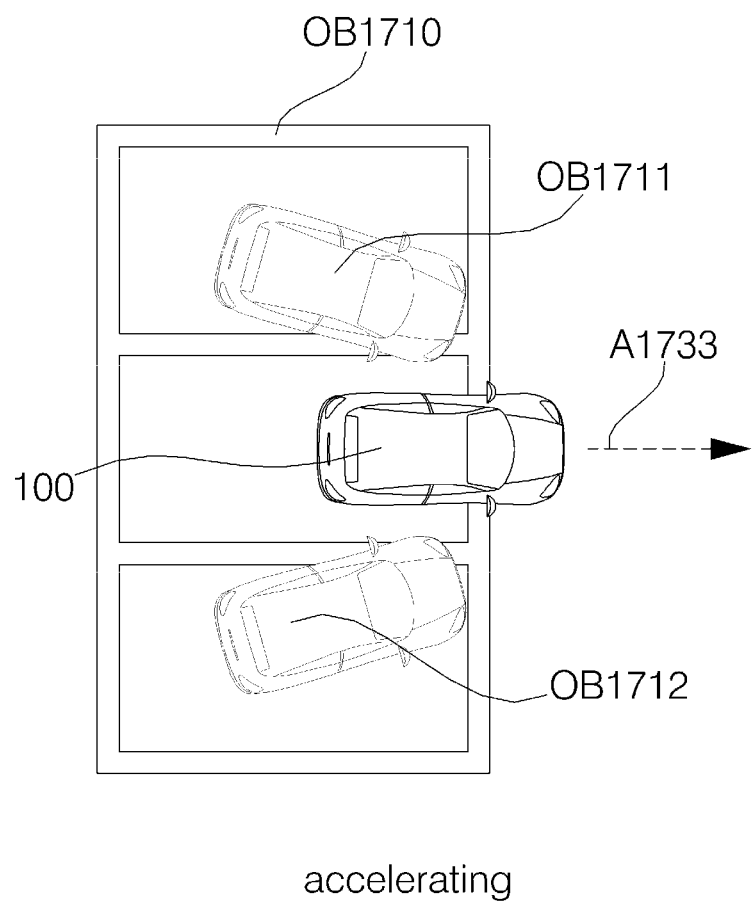

FIGS. 17A, 17B and 17C are diagrams illustrating an example speed control of a vehicle.

The camera 810 may rotate at the same angular speed as the side mirror 110 and may capture the external image of the vehicle 100 at a first point and a second point.

For example, the first point may be a point where the camera 810 is located in a state where the side mirror 110 is folded.

The second point may be a point where the camera 810 is located in a state where the side mirror 110 is unfolded.

The controller 850 may control the camera 810 so that a first image captured at the first point and a second image captured at the second point may have an overlapping area.

Referring to FIG. 17A, the controller 850 may detect an object (OB1710, OB1711, and OB1712) around the vehicle, through the image processing of the first image and the second image captured in a stopped state.

The controller 850 may measure the distance between each of the objects OB1710, OB1711, and OB1712 and the vehicle 100, based on the information related to the detected object OB1710, OB1711, and OB1712.

The controller 850 may generate a route for the vehicle 100 to depart from a parked state, based on the information related to the object OB1710, OB1711, and OB1712.

The controller 850 may generate a route between other vehicles OB1711 and OB1712, when the other vehicles OB1711 and OB1712 intrude into and are parked on a parking line OB1710 in which the vehicle 100 is parked.

The controller 850 may control the interface 870 to provide a signal to the power train driving unit 610 so that the vehicle 100 may travel at a constant speed A1731 along the generated route.

Referring to FIG. 17B, in case the distance between the vehicle 100 and the other vehicles OB1711 and OB1712 is less than a set value when the vehicle 100 travels along the generated route, the controller 850 may control the interface 870 to provide a signal to the power train driving unit 610 so that the vehicle 100 may travel at a reduced speed A1732 when the distance to the other vehicles OB1711 and OB1712 is less than the set value.

The controller 850 may control the interface 870 to provide a signal to the power train driving unit 610 so that the deceleration of the vehicle 100 may be started at the time when the distance between the vehicle and the other vehicles OB1711 and OB1712 is less than the set value.

Referring to FIG. 17C, when the vehicle 100 continues to travel along the generated route and the distance between the vehicle 100 and the other vehicles OB1711 and OB1712 is equal to or greater than a set value, the controller 850 may control the interface 870 to provide a signal to the power train driving unit 610 so that the vehicle 100 may accelerate to travel at an increased speed A1733

The controller 850 may control the interface 870 to provide a signal to the power train driving unit 610 so that the vehicle 100 may start to accelerate at the time when the distance between the vehicle and the other vehicles OB1711 and OB1712 is equal to or greater than the set value.

In some implementations, although not shown, when there is other vehicle OB1711 approaching the generated route, the controller 850 may control the interface 870 to provide a signal to the power train driving unit 610 so that the vehicle 100 may be decelerated when the distance to the other vehicle OB1611 is less than the set value.

When the other vehicle OB1711 continues to travel and the distance between the vehicle 100 and the other vehicle OB1711 is equal to or greater than a set value, the controller 850 may control the interface 870 to provide a signal to the power train driving unit 610 so that the vehicle 100 may be decelerated.

Figure 18:
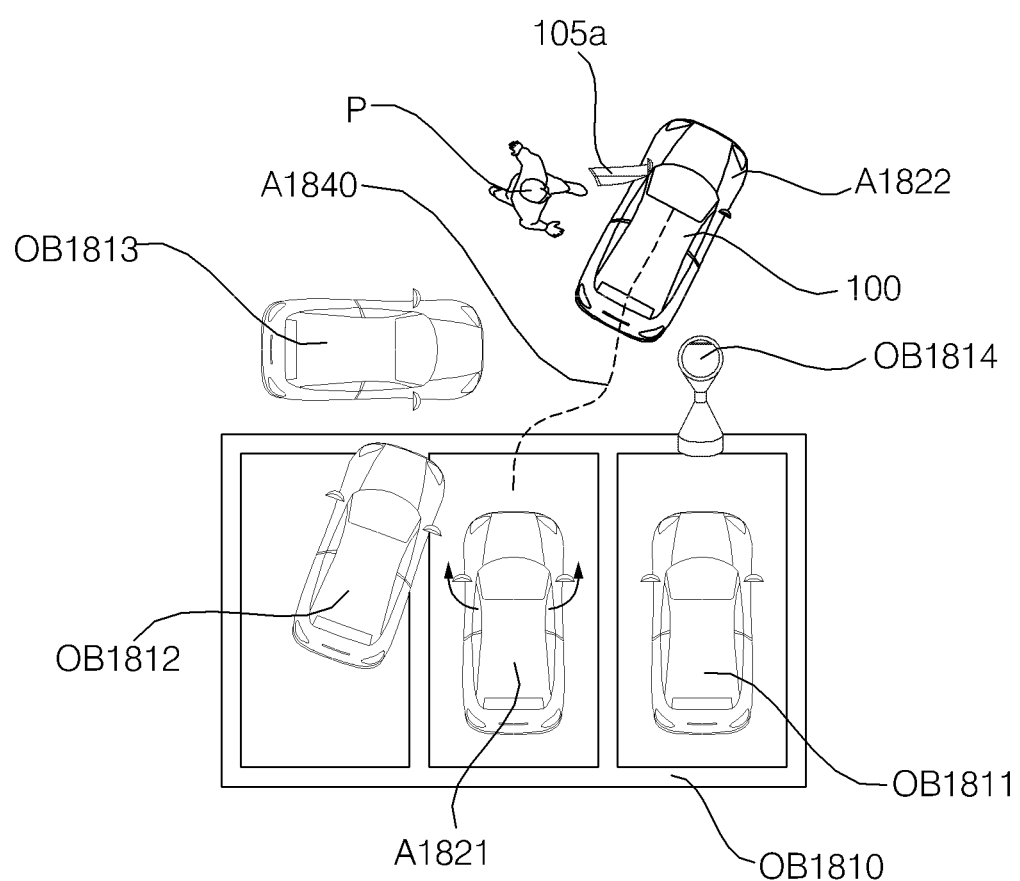
FIG. 18 is a diagram illustrating an example route of vehicle and an example door control.

FIG. 18 is a diagram illustrating an example vehicle moving out from a parking space and an example door control of the vehicle.

The camera 810 may rotate at the same angular speed as the side mirror 110 and may capture the external image of the vehicle 100 at a first point and a second point.

For example, the first point may be a point where the camera 810 is located in a state where the side mirror 110 is folded.

The second point may be a point where the camera 810 is located in a state where the side mirror 110 is unfolded.

The controller 850 may control the camera 810 so that a first image captured at the first point and a second image captured at the second point may have an overlapping area.

Referring to FIG. 18, the controller 850 may detect an object (OB1810, OB1811, OB1812, OB1813, and OB1814) around the vehicle, through the image processing of the first image and the second image captured in a stopped state.

The controller 850 may measure the distance between each of the objects OB1810, OB1811, OB1812, OB1813, and OB1814 and the vehicle 100, based on the information related to the detected object OB1610, OB1611, and OB1612.

The controller 850 may generate a route for the vehicle 100 to depart from a parked state, based on the information related to the object OB1810, OB1811, OB1812, OB1813, and OB1814.

The controller 850 may generate a route as a vacant space between a plurality of objects OB 1810, OB 1811, OB 1812, OB 1813, OB 1814.

The controller 850 may generate a route A1840 of the vehicle 100 ranging from a parking position A1821 of the vehicle 100 to a pickup position A1822 where a driver P can ride.

The pickup position A1822 may be a position where the driver's seat door 105a of the vehicle 100 may be opened up to a preset amount of opening.

The controller 850 may control the interface 870 to provide a signal to the power train driving unit 610 so that the vehicle 100 may travel to the pickup position A1822 and then stop.

The controller 850 may control the interface 870 to provide a signal to the door driving unit 631 so that the driver's seat door 105a may be opened at the pickup position A1822.

For example, even if it is not possible to autonomously perform parking out in an entire section of a full route including the route A1840 corresponding to a section ranging from the parking position A1821 of the vehicle 100 to the pickup position A1822, when it is possible to autonomously perform parking out in a certain section of the full route corresponding to the route A1840, the controller 850 may control the vehicle driving device 600 so that the vehicle 100 may autonomously perform parking out along the generated route A1840.

For example, when only a parking out trigger signal is input without a separate destination input from the user, the controller 850 may generate the route A1840 ranging from the parking position A1821 of the vehicle 100 to the pickup position A1822.

Figure 19:
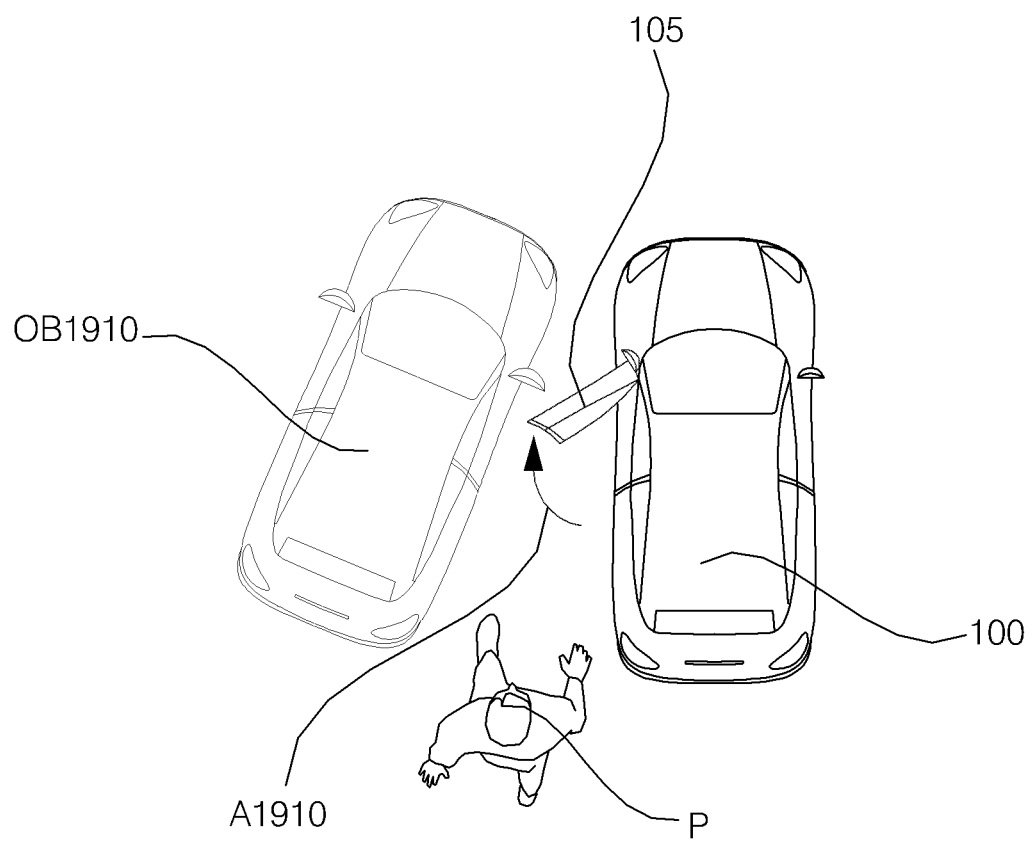
FIG. 19 is a diagram illustrating an example door control.

FIG. 19 is a diagram illustrating an example door control.

The camera 810 may rotate at the same angular speed as the front door 105 and may capture the external image of the vehicle 100 at a first point and a second point.

For example, the first point may be a point where the camera 810 is located in a state where the front door 105 is closed.

The second point may be a point where the camera 810 is located in a state where the front door 105 is opened.

The controller 850 may control the camera 810 so that a first image captured at the first point and a second image captured at the second point may have an overlapping area.

Referring to FIG. 19, the controller 850 may detect other vehicle OB1910, through the image processing of the first image and the second image captured in a stopped state.

The controller 850 may set an amount of door opening A1910, based on the information related to the other vehicle OB1910.

The controller 850 may set the amount of door opening of the vehicle 100, based on the distance information between the door 105 of the vehicle 100 and the other vehicle OB1910.

The controller 850 may set the amount of door opening of the vehicle 100, based on three-dimensional distance information between each part of the door 105 of the vehicle 100 and the other vehicle OB1910, not on two-dimensional distance information between an end of the door 105 of the vehicle 100 and the other vehicle OB1910.

The controller 850 may set the amount of door opening of the vehicle 100, by measuring the distance between the door 105 of the vehicle 100 and the other vehicle OB1910 in real time, through the image processing of the first image and the second image captured by the camera 810 while the door 105 of the vehicle 100 is opened.

The controller 850 may control the interface 870 to provide a signal to the door driving unit 631 of the vehicle 100 so that the door of the vehicle 100 may be opened by the amount of door opening A1910.

For example, when the user manually opens the door, the controller 850 may control the door driving unit 631 so that the door may be locked so as to be opened only by the amount of door opening A1910.

For example, when the user manually opens the door, the controller 850 may control the door driving unit 631 so that the user may feel resistance before the door is opened up to the amount of door opening A1910, thereby achieving a user-friendly control of the door.

For example, the controller 850 may control the vehicle door to be automatically opened by the amount of door opening A1910.

For example, the controller 850 may control the vehicle door so that the rotational speed of the door may gradually decrease to stop before the vehicle door is opened up to the amount of door opening A1910, thereby achieving a user-friendly control of the door.

The controller 850 may measure the distance between the door 105 of the vehicle 100 and the other vehicle OB1910 in real time, through the image processing of the first image and the second image captured by the camera 810 while the door 105 of the vehicle 100 is opened.

The controller 850 may control the door driving unit 631 to stop the door 105, when the distance between the door 105 of the vehicle 100 and the other vehicle OB1910 is less than a set value.

Figure 20A:
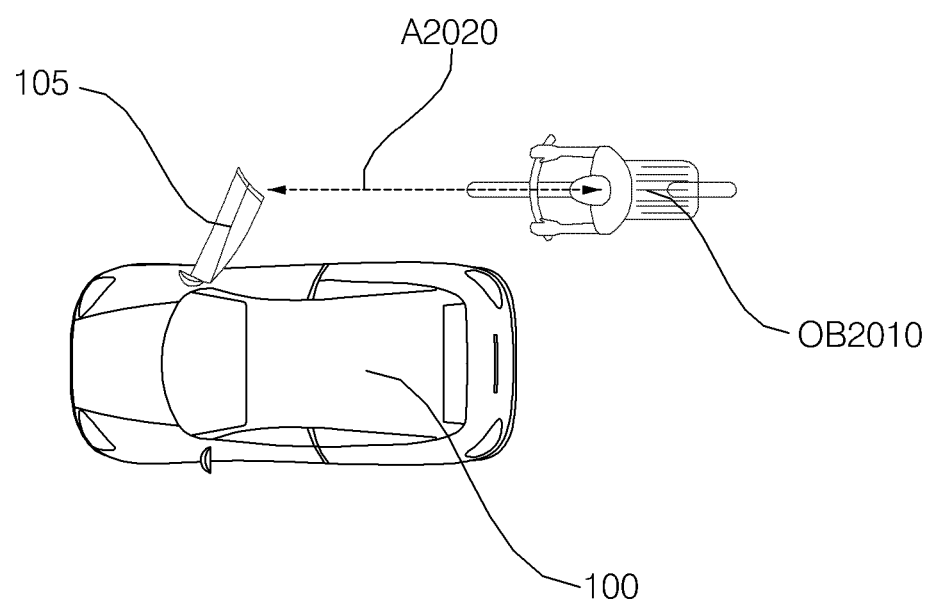
FIG. 20A and FIG. 20B are diagrams illustrating an example door control.
Figure 20B:
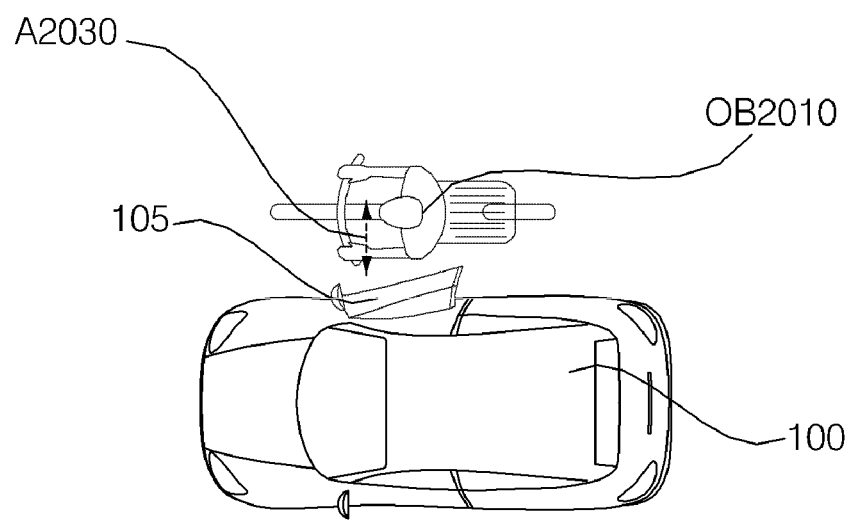

FIG. 20A and FIG. 20B are diagrams illustrating an example door control.

The camera 810 may rotate at the same angular speed as the front door 105 and may capture the external image of the vehicle 100 at a first point and a second point.

For example, the first point may be a point where the camera 810 is located in a state where the front door 105 is closed.

The second point may be a point where the camera 810 is located in a state where the front door 105 is opened.

The controller 850 may control the camera 810 so that a first image captured at the first point and a second image captured at the second point may have an overlapping area.

Referring to FIG. 20A, the controller 850 may detect a moving object OB2010 approaching the vehicle 100, through the image processing of the first image and the second image.

The controller 850 may control the opening and closing of the door 105, based on a distance A2020 between the vehicle 100 and the moving object OB2010.

For example, when the moving object OB2010 approaches within a certain distance from the door 105, the controller 850 may control the interface 870 to provide a signal to the door driving unit 631 so that the door 105 may be closed.

The controller 850 may control the door 105 to close, for example, based on the speed of the moving object OB2010.

For example, the controller 850 may control the distance between the vehicle 100, which is controlled to close the door, and the moving object OB2010 to be increased, when the speed of the moving object OB2010 is high, rather than the case in which the speed of the moving object OB2010 is low.

For example, the controller 850 may control the door 105 to close more quickly, when the speed of the moving object OB2010 is high rather than the case in which the speed of the moving object OB2010 is low.

Referring to FIG. 20B, the controller 850 may control the opening and closing of the door 105, based on a distance A2030 between the vehicle 100 and the moving object OB2010.

For example, the controller 850 may control the door 105 to close just only to the extent that collision with the moving object OB2010 can be avoided, without closing the door 105 completely.

For example, the controller 850 may calculate a location when the moving object OB2010 is closest to the door 105, and control an amount of closing of the door 105, based on the information related to the distance and the speed of the moving object OB2010.

When closing the door 105 based on the information related to the moving object OB2010, the controller 850 may control the opening and closing of the door 105, for example, based on the result of determining whether passenger is getting off.

For example, when the moving object OB2010 approaches within a certain distance from the door 105, if it is determined that the passenger is not getting off, the controller 850 may control the door 105 to be closed.

For example, when the moving object OB2010 approaches within a certain distance from the door 105, if it is determined that the passenger is getting off, the controller 850 may control the door 105 to be closed only in a certain range.

For example, when the moving object OB2010 approaches within a certain distance from the door 105, if it is determined that the passenger is getting off, the controller 850 may not control the door 105 to be closed.

Figure 21A:
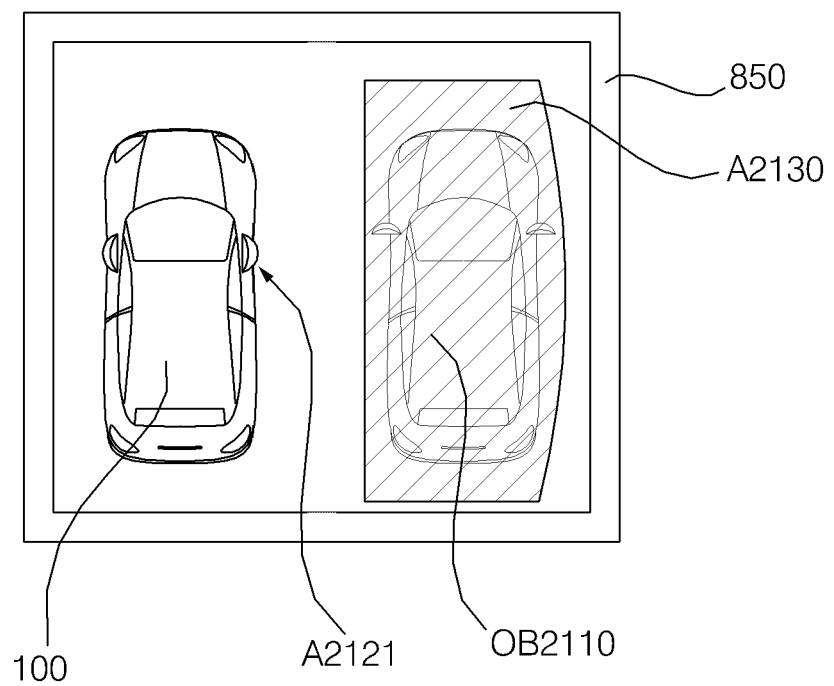
FIG. 21A and FIG. 21B are diagrams illustrating example images displayed on an example display.
Figure 21B:
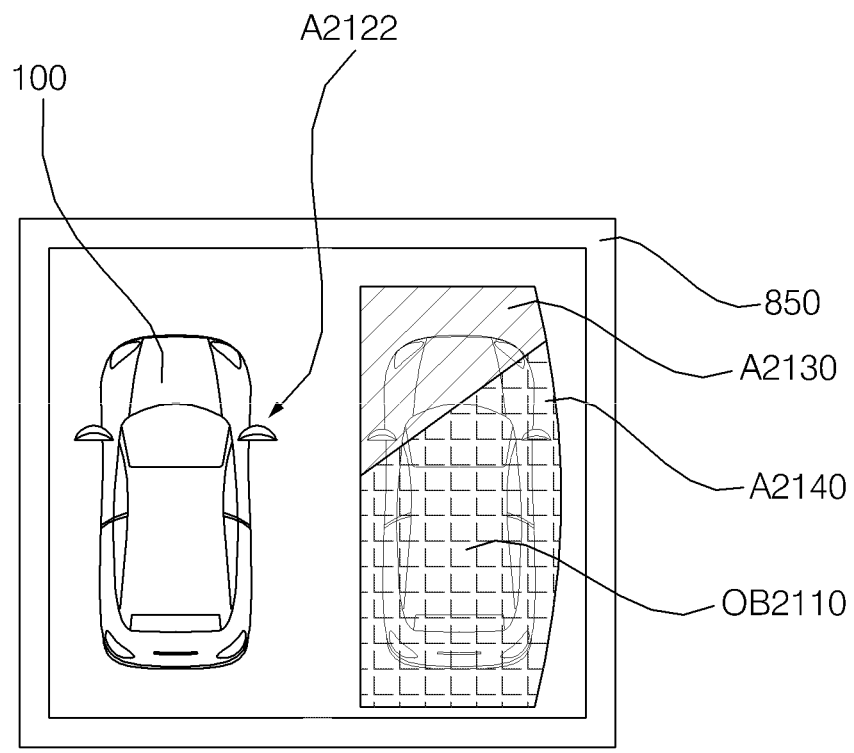

FIG. 21A and FIG. 21B are diagrams illustrating an example image displayed on an example display.

The camera 810 may rotate at the same angular speed as the side mirror 110 and may capture the external image of the vehicle 100 at a first point and a second point.

For example, the first point may be a point where the camera 810 is located in a state A2121 in which the side mirror 110 is folded.

The second point may be a point where the camera 810 is located in a state A2122 where the side mirror 110 is unfolded.

At this time, the controller 850 may control the camera 810 so that a first image captured at the first point and a second image captured at the second point may have an overlapping area.

The controller 850 may detect an object OB2110 around the vehicle, through the image processing of the first image and the second image.

The controller 850 may control the display 830 so that the image captured by the camera 810 may be displayed.

Referring to FIG. 21A, for example, the controller 850 may control the display 830 so that a top view image viewed from above of the vehicle 100 may be displayed.

The top view image of the vehicle 100 may be generated based on pre-stored information of vehicle 100.

For example, the controller 850 may control the display 830 so that an image of the object OB2110 may be displayed.

The controller 850 may control the display 830 so that the image displayed on the display 830 may be displayed to be directional, in response to the direction in which the side mirror 110 is rotated.

For example, the controller 850 may control the image displayed on the display 830 to be gradually displayed in the direction in which the side mirror 110 is rotated.

For example, when the right side mirror 110 is unfolded and the captured image is displayed on the display 830, the controller 850 may control the display 830 so that the object OB2110 may be gradually displayed on the display 830 from the right portion to the left portion, as the camera 810 rotates from right to left when viewed from inside the vehicle 100.

For example, when the left side mirror 110 is unfolded and the captured image is displayed on the display 830, the controller 850 may control the display 830 so that the object OB2110 may be gradually displayed on the display 830 from the left portion to the right portion, as the camera 810 rotates from left to right when viewed from inside the vehicle 100.

The controller 850 may measure the distance between the object OB2110 and the vehicle 100, based on the information related to the detected object OB2110.

The controller 850 may control the display 830 so that an area where the distance between the vehicle 100 and the object OB2110 is measured may be displayed differently from an area where the distance is not measured.

The controller 850 may control the area where the distance is measured to be displayed differently from the area where the distance is not measured, through the image processing.

For example, the controller 850 may control at least one of brightness, saturation, color, and sharpness to be different so that the area where the distance is measured and the area where the distance is not measured may be displayed separately.

For example, the controller 850 may control the area where the distance is measured to be displayed differently from the area where the distance is not measured, by using a graphic object.

Referring to FIG. 21B, for example, the controller 850 may control the display 830 to display a first graphic object A2130 covering the object OB2110 when the distance between the vehicle 100 and the object OB2110 is not measured.

The controller 850 may control the display 830 to display a second graphic object A2140 covering the area where the distance between the vehicle 100 and the object OB2110 is measured among an area covered by the first graphic object A2130.

For example, as the distance between the object OB2110 and the vehicle 100 is measured by the controller 850, the controller 850 may control the display 830 so that at least one of the location, the size, and the color of the graphic objects A2130 and A2140 covering the object OB2110 may be changed.

For example, the controller 850 may control to display a boundary line between the area where the distance is measured and the area where the distance is not measured, so that the area may be displayed separately.

For example, the controller 850 may control the display 830 so that the brightness of the area in which the distance is measured may be brighter than the brightness of the area before the distance is measured.

Referring to FIG. 21B, for example, the controller 850 may control the display 830 so that the size of the first graphic object A2130 may gradually decrease in the direction in which the side mirror 110 rotates and the size of the second graphic object A2140 may gradually increase in the direction in which the side mirror 110 rotates, as the distance between the object OB2110 and the vehicle 100 is measured by the controller 850.

Figure 22:
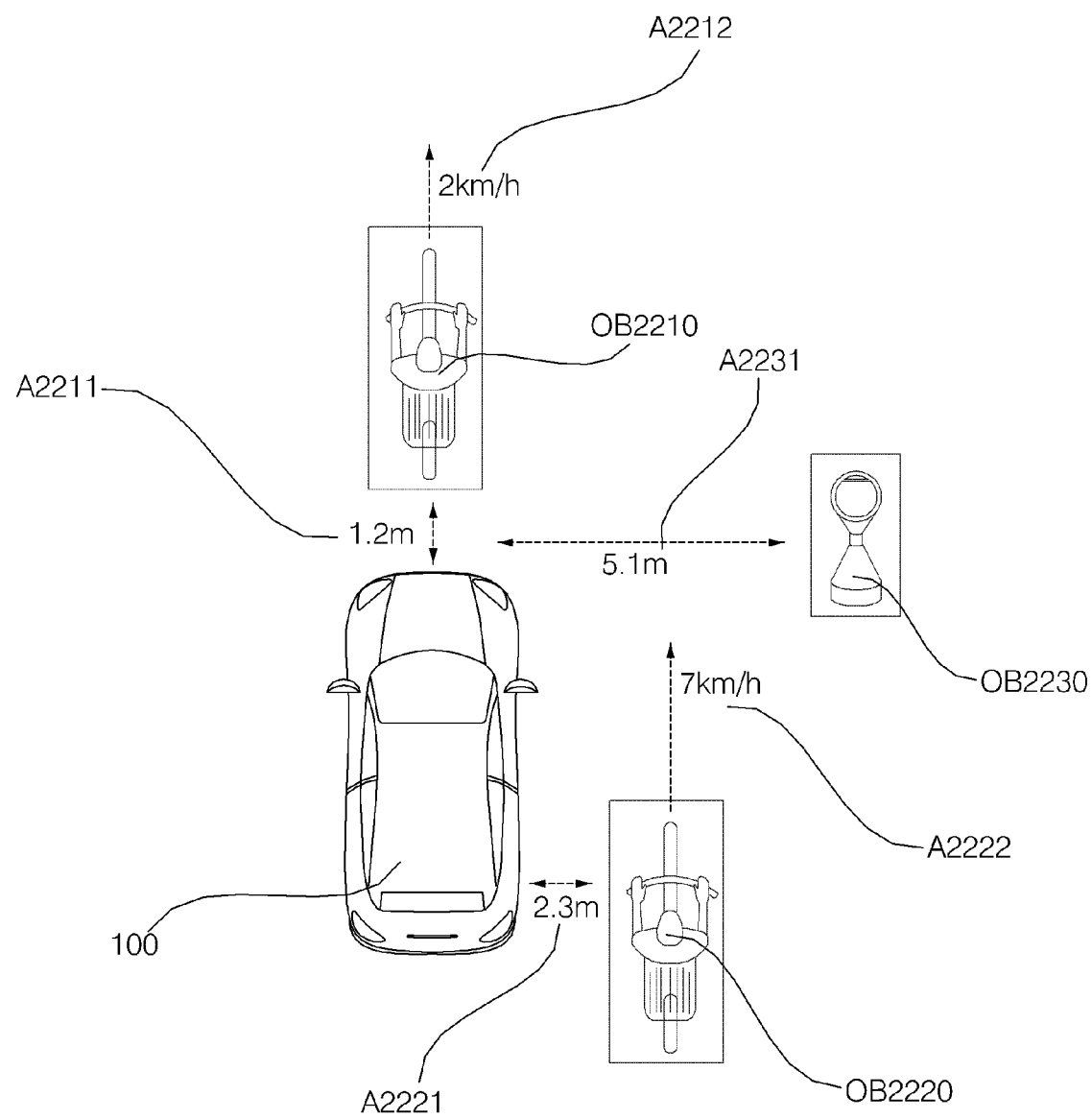
FIG. 22 is a diagram illustrating an example image displayed on an example display.

FIG. 22 is a diagram illustrating an example image displayed on an example display.

The camera 810 may rotate at the same angular speed as the side mirror 110 and may capture the external image of the vehicle 100 at a first point and a second point.

For example, the first point may be a point where the camera 810 is located in a state where the side mirror 110 is folded.

The second point may be a point where the camera 810 is located in a state where the side mirror 110 is unfolded.

At this time, the controller 850 may control the camera 810 so that a first image captured at the first point and a second image captured at the second point may have an overlapping area.

The controller 850 may detect an object OB2210, OB2220, and OB2230 around the vehicle, through the image processing of the first image and the second image.

The controller 850 may measure the distance between the vehicle 100 and each of the objects OB2210, OB2220 and OB2230, based on the information related to the detected object OB2210, OB2220 and OB2230.

Referring to FIG. 22, for example, the controller 850 may control the display 830 so that a top view image viewed from above of the vehicle 100 may be displayed.

The top view image of the vehicle 100 may be generated based on pre-stored information of vehicle 100.

The controller 850 may control the display 830 so that an image of the object OB2210, OB2220 and OB2230 may be displayed, based on the information related to the object OB2210, OB2220 and OB2230.

The controller 850 may control the display 830 so that the dynamic information of the objects OB2210, OB2220 and OB2230 may be superimposed on the image captured by the camera 810.

The dynamic information of the object OB2210, OB2220 and OB2230 may include at least one of a distance between the vehicle and the object OB2210, OB2220 and OB2230, a speed of the object OB2210, OB2220 and OB2230, and an acceleration of the object OB2210, OB2220 and OB2230.

For example, in the case of the object OB2210 located in front of the vehicle 100, the controller 850 may control the display 830 so that a distance A2211 from the front of the vehicle body may be displayed.

For example, in the case of the object OB2220 and OB2230 located in the side of the vehicle 100, the controller 850 may control the display 830 so that a distance A2221 and A2231 from a corresponding side of the vehicle body may be displayed.

For example, in the case of the moving object OB2210 and OB2220, the controller 850 may control the display 830 so that the speed of the moving object OB2210 and OB2220 may be displayed by an arrow and a character A2212 and A2222.

For example, the controller 850 may control the display 830 so that the dynamic information of the object OB2210, OB2220, and OB2230, which is determined to have a high risk among a plurality of detected objects OB2210, OB2220, and OB2230, may be displayed.

The risk level may be determined by the controller 850, based on at least one of a shape of the object OB2210, OB2220 and OB2230, dynamic information of the object OB2210, OB2220 and OB2230, and a type of the object OB2210, OB2220 and OB2230.

For example, when displaying the dynamic information of the object OB2210, OB2220, and OB2230, the controller 850 may display the image of the object OB2210, OB2220 and OB2230 and/or the dynamic information of the object OB2210, OB2220 and OB2230 differently depending on the risk.

For example, the controller 850 may display the color of the graphic object covering the objects OB2210 and OB2220, which are determined to have a high risk, differently from the color of the graphic object covering the object OB2230 which is determined to have a low risk.

The present disclosure described above may be implemented as computer readable codes on a medium on which a program is recorded. The computer readable medium includes all kinds of recording units in which data that may be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, and may also be implemented in the form of a carrier wave (e.g., transmission over the Internet). In some examples, the computer may include a processor or a controller. Accordingly, the above detailed description is to be considered in all respects as illustrative and not restrictive. The scope of the present disclosure should be determined by rational interpretation of the appended claims, and all changes within the scope of equivalents of the present disclosure are included in the scope of the present disclosure.

What is claimed is:

1. A driving assistance system for a vehicle, comprising:
   at least one processor;
   an interface configured to communicate with the at least one processor; and
   a camera disposed on a mounting apparatus, the mounting apparatus having an end that is rotatably coupled to the vehicle and that is configured to rotate about a rotation axis that is spaced apart from the camera,
   wherein the camera is configured to rotate together with the mounting apparatus from a first point to a second point, the camera being configured to capture an external image of the vehicle at the first point and at the second point,
   wherein the at least one processor is configured to:
      control the camera to capture a first image at the first point and a second image at the second point, the first image and the second image including an overlapping area,
      detect an object around the vehicle based on an image processing of the first image and the second image,
      determine a distance between the object and the vehicle based on the first image and the second image,
      generate a route for the vehicle to depart from a parked state based on location information of the object around the vehicle,
      generate the route from a first location at which the vehicle is parked to a second location at which a driver side door of the vehicle is able to be opened to a preset amount of opening, the preset amount of opening being set according to at least one of a characteristic of a driver of the vehicle or a door opening record of the driver side door by the driver, and
      control the interface to provide a signal to a door driving unit to cause the door driving unit to open the driver side door based on an arrival of the vehicle at the second location.

2. The driving assistance system according to claim 1, wherein the rotation axis forms an angle less than 90 degrees with respect to a direction perpendicular to a ground.

3. The driving assistance system according to claim 1, wherein the camera is disposed on a side mirror of the vehicle that is configured to rotate about the rotation axis, and
wherein the camera is further configured to capture the external image of the vehicle during a rotation of the side mirror.

4. The driving assistance system according to claim 1, wherein the camera is disposed on a front door of the vehicle and further configured to capture the external image of the vehicle during a rotation of the front door.

5. The driving assistance system according to claim 1, wherein the at least one processor is further configured to:
determine whether the object is located in a space through which the vehicle passes based on the vehicle traveling in a straight line, and
generate the route for the vehicle to depart from the parked state that allows the vehicle to avoid the object based on a determination that the object is located in the space through which the vehicle passes based on the vehicle traveling in the straight line.

6. The driving assistance system according to claim 1, wherein the at least one processor is further configured to:
determine whether the object is located in a space through which the vehicle passes based on the vehicle traveling in a forward direction, and
generate the route for the vehicle to depart from the parked state that allows the vehicle to move in a backward direction opposite to the forward direction based on a determination that the object is located in the space through which the vehicle passes based on the vehicle traveling in the forward direction.

7. The driving assistance system according to claim 1, wherein the at least one processor is further configured to:
identify a mode for the vehicle to depart from the parked state based on a selection of one of a plurality of maneuvers for the vehicle to depart from the parked state and a selection of one of a plurality of directions for the vehicle to depart from the parked state,
wherein the plurality of maneuvers for the vehicle to depart from the parked state comprises a right-angle maneuver and a parallel maneuver, and the plurality of directions for the vehicle to depart from the parked state comprises a left front direction, a left rear direction, a right front direction, and a right rear direction of the vehicle,
generate the route for the vehicle to depart from the parked state based on the mode, and
control the interface to provide a signal to a vehicle driving device to thereby control the vehicle to travel along the route for the vehicle to depart from the parked state.

8. The driving assistance system according to claim 1, wherein the camera is disposed on a side mirror of the vehicle and further configured to capture the external image of the vehicle, and
wherein the at least one processor is further configured to, based on the object being located in the route for the vehicle to depart from the parked state, control the interface to provide a signal to a mirror driving unit to cause the mirror driving unit to fold the side mirror based on the vehicle approaching the object, or to unfold the side mirror based on the vehicle moving away from the object.

9. The driving assistance system according to claim 1, wherein the at least one processor is further configured to, based on the object being located in the route for the vehicle to depart from the parked state, control the interface to provide a signal to a power train driving unit to cause the power train driving unit to decelerate the vehicle based on the vehicle approaching the object, or to accelerate the vehicle based on the vehicle moving away from the object.

10. The driving assistance system according to claim 1 wherein the at least one processor is further configured to:
identify an amount of opening of a door of the vehicle based on location information of the object, and
control the interface to provide a signal to the door driving unit to cause the door driving unit to open the door of the vehicle to the identified amount of opening.

11. The driving assistance system according to claim 10, wherein the at least one processor is further configured to identify the amount of opening of the door of the vehicle based on distance information between the door of the vehicle and the object.

12. The driving assistance system according to claim 10, wherein the at least one processor is further configured to:
determine a distance between the vehicle and the object based on the location information of the object, and
control the interface to provide a signal to the door driving unit to cause the door driving unit to close the door based on a determination that the object approaches the vehicle within a distance from the door.

13. The driving assistance system according to claim 1, further comprises a display, and
wherein the at least one processor is further configured to control the display to display an image captured by the camera.

14. The driving assistance system according to claim 13, wherein the at least one processor is further configured to control the display to:
display, based on a measurement of a distance between the object and the vehicle, a first area where the distance has been measured, the first area appearing differently in the image from a second area where the distance has not been measured.

15. The driving assistance system according to claim 13, wherein the at least one processor is further configured to control the display to display images captured by the camera, the images having directionality corresponding to a direction of rotation of the mounting apparatus.

16. The driving assistance system according to claim 13, wherein the at least one processor is further configured to control the display to superimpose, on to the image, information regarding motion of the object.

17. The driving assistance system according to claim 13, wherein the at least one processor is further configured to control the display to display the image and at least a portion of information generated by an image processing of the image captured by the camera.

18. The driving assistance system according to claim 1, further comprising a non-transitory memory device that is configured to store the preset amount of opening, the characteristic of the driver, and the door opening record.

19. The driving assistance system according to claim 1, wherein the characteristic of the driver includes a body shape of the driver or a preference for the preset amount of opening of the driver side door.

20. A vehicle comprising:
a plurality of wheels;
a power source configured to drive a rotation of at least one of the plurality of wheels; and a driving assistance system comprising:
  at least one processor,
  an interface configured to communicate with the at least one processor, and
  a camera disposed on a mounting apparatus, the mounting apparatus having an end that is rotatably coupled to the vehicle and that is configured to rotate about a rotation axis that is spaced apart from the camera,
wherein the camera is configured to rotate together with the mounting apparatus from a first point to a second point, the camera being configured to capture an external image of the vehicle at the first point and at the second point,
wherein the at least one processor is configured to:
  control the camera to capture a first image at the first point and a second image at the second point, the first image and the second image including an overlapping area,
  detect an object around the vehicle based on an image processing of the first image and the second image,
  determine a distance between the object and the vehicle based on the first image and the second image,
  generate a route for the vehicle to depart from a parked state based on location information of the object around the vehicle,
  generate the route from a first location at which the vehicle is parked to a second location at which a driver side door of the vehicle is able to be opened to a preset amount of opening, the preset amount of opening being set according to at least one of a characteristic of a driver of the vehicle or a door opening record of the driver side door by the driver, and
  control the interface to provide a signal to a door driving unit to cause the door driving unit to open the driver side door based on an arrival of the vehicle at the second location.

* * * * *